US008086652B1

(12) United States Patent  
Bisson et al.

(10) Patent No.: US 8,086,652 B1  
(45) Date of Patent: Dec. 27, 2011

(54) STORAGE SYSTEM-BASED HOLE PUNCHING FOR RECLAIMING UNUSED SPACE FROM A DATA CONTAINER

(75) Inventors: Timothy Bisson, Sunnyvale, CA (US); Shankar Pasupathy, Sunnyvale, CA (US); Garth Richard Goodson, Sunnyvale, CA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 414 days.

(21) Appl. No.: 11/838,966

(22) Filed: Aug. 15, 2007

Related U.S. Application Data

(60) Provisional application No. 60/914,541, filed on Apr. 27, 2007.

(51) Int. Cl.  
G06F 12/02 (2006.01)

(52) U.S. Cl. .................................. 707/823; 707/827
(58) Field of Classification Search .............. 707/823, 707/827  
See application file for complete search history.

(56) References Cited

U.S. PATENT DOCUMENTS

| | | | | |
|---|---|---|---|---|
| 5,193,184 | A * | 3/1993 | Belsan et al. ................ | 711/4 |
| 5,819,292 | A | 10/1998 | Hitz et al. | |
| 6,959,313 | B2 * | 10/2005 | Kapoor et al. ............... | 707/205 |
| 7,107,385 | B2 | 9/2006 | Rajan et al. | |
| 7,272,613 | B2 * | 9/2007 | Sim et al. ..................... | 1/1 |
| 7,599,971 | B1 * | 10/2009 | Hagerstrom et al. .. | 707/999.204 |
| 7,603,532 | B2 * | 10/2009 | Rajan et al. ................. | 711/166 |
| 7,640,406 | B1 * | 12/2009 | Hagerstrom et al. ........ | 711/159 |
| 2002/0083037 | A1 * | 6/2002 | Lewis et al. .................. | 707/1 |
| 2004/0030822 | A1 * | 2/2004 | Rajan et al. .................. | 711/4 |
| 2004/0091239 | A1 * | 5/2004 | Poslinski et al. ............. | 386/46 |
| 2005/0246401 | A1 | 11/2005 | Edwards et al. | |
| 2006/0085471 | A1 | 4/2006 | Rajan et al. | |
| 2006/0112222 | A1 * | 5/2006 | Barrall ........................ | 711/114 |
| 2007/0113036 | A1 * | 5/2007 | Gal-Oz ........................ | 711/165 |
| 2007/0260830 | A1 * | 11/2007 | Faibish et al. ............... | 711/162 |

OTHER PUBLICATIONS

Microsoft, Article 1404418, Detailed Explanation of FAT Boot Sector, 2003, pp. 1-6.*  
Rubel, Easy Automated Snapshot-style Backups with Linux and Rsync, 2004, pp. 1-18.*  
Microsoft, Article 154997, Description of FAT32 File System, Jan. 19, 2007, pp. 1-3.*  
Naseef, Overlay Pseudo Filesystem, 1998, pp. 1-7.*  
Rankin, Knoppix Hacks, O'Reilly, 2005, pp. 1-2.*  
U.S. Appl. No. 10/423,391 for System and Method for Reserving Space to Guarantee File Writability in a File System Supporting Persistent Consistency Point Images, by Corbett et al., on Apr. 25, 2003.  
U.S. Appl. No. 60/914,541 for Storage System-Based Hole Punching for Reclaiming Unused Space From a Data Container, by Bisson et al., on Apr. 27, 2007.

* cited by examiner

Primary Examiner — John E Breene  
Assistant Examiner — Albert Phillips, III  
(74) Attorney, Agent, or Firm — Cesari and McKenna, LLP

(57) ABSTRACT

A system and method reclaims unused storage space from a data container, such as a logical unit number (LUN) of a storage system. In particular, a novel technique is provided that allows a storage system to reclaim storage space not used by a client file system for which the storage system maintains storage, without requiring assistance from the client file system to determine storage usage. In other words, storage system may independently reclaim storage space not used by the client file system, without that file system's intervention.

25 Claims, 15 Drawing Sheets

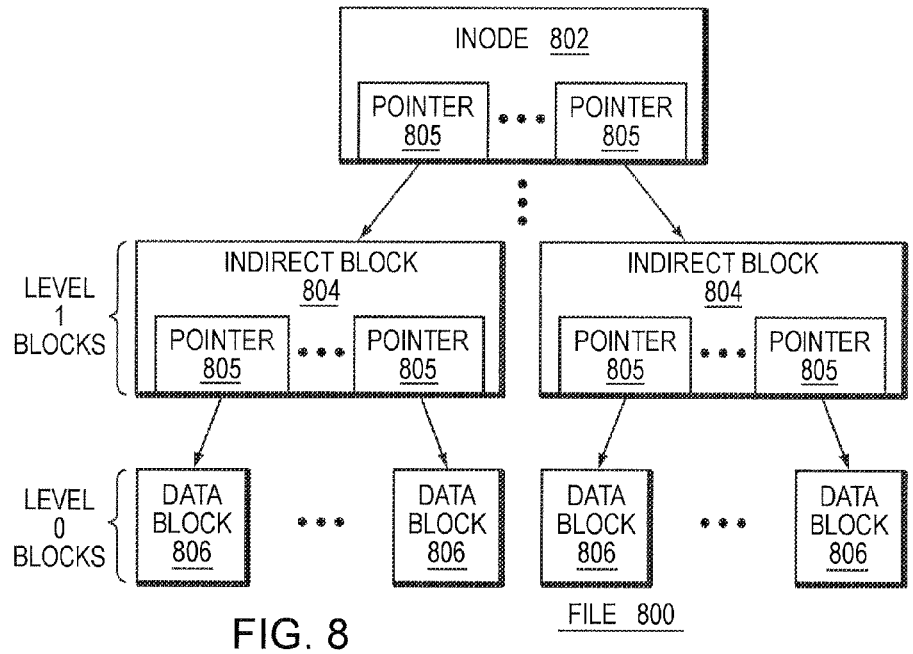
FIG. 8
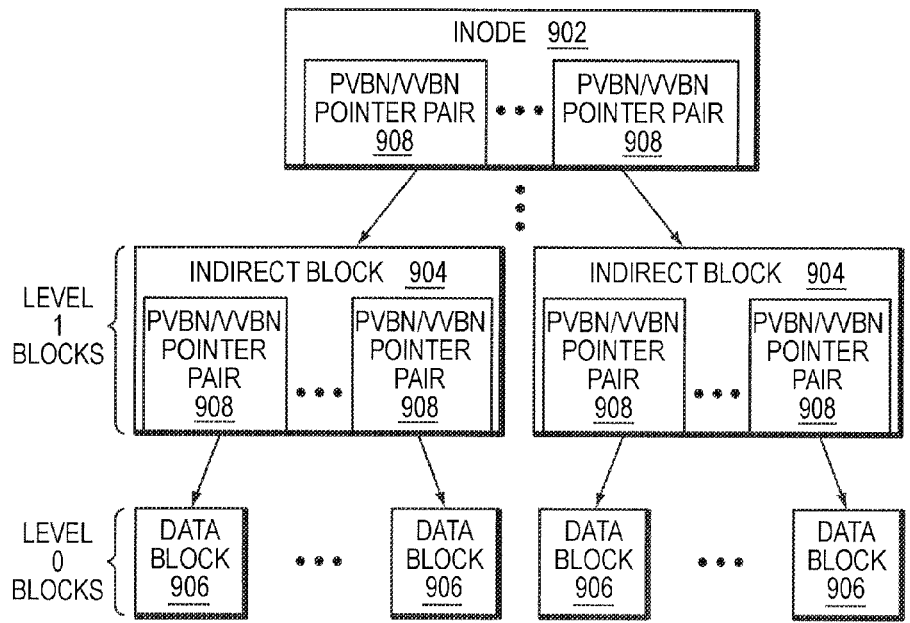
FIG. 9    FILE 900

US 8,086,652 B1

STORAGE SYSTEM-BASED HOLE PUNCHING FOR RECLAIMING UNUSED SPACE FROM A DATA CONTAINER

CROSS-REFERENCE TO RELATED APPLICATION

The present application claims the benefit of U.S. Provisional Patent Application Ser. No. 60/914,541, which was filed on Apr. 27, 2007, by Timothy Bisson et al. for a STORAGE SYSTEM-BASED HOLE PUNCHING FOR RECLAIMING UNUSED SPACE FROM A DATA CONTAINER, which is hereby incorporated by reference.

FIELD OF THE INVENTION

The present invention relates to storage systems and, in particular, to reclaiming unused space from a data container on a storage system.

BACKGROUND OF THE INVENTION

A storage system is a computer that provides storage service relating to the organization of information on writable persistent storage devices, such as memories, tapes, or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object, or any other storage entity that does not correspond directly to a set of fixed data storage devices. A file system is, generally, a computer system for managing such files, including the allocation of fixed storage space to store files on a temporary or permanent basis.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network, or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS), and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (LUN).

In some SAN environments, storage systems may export virtual disks (vdisks) to clients utilizing block-based protocols, such as, for example, Fibre Channel and iSCSI. One example of a vdisk is a special file type in a volume that derives from a plain file, but that has associated export controls and operation restrictions that support emulation of a disk. Vdisks are described further in U.S. Pat. No. 7,107,385, entitled STORAGE VIRTUALIZATION BY LAYERING VIRTUAL DISK OBJECTS ON A FILE SYSTEM, by Vijayan Rajan, et al. issued on Sep. 12, 2006, the contents of which are hereby incorporated by reference. These block-based protocols and the exported file/vdisks appear as physical disk devices to the clients of the storage system.

In such SAN environments, the storage systems may further export virtual disks as LUNs that can be accessed by clients using block-based protocols. As such, an administrator typically organizes logical volumes using the exported LUNs. A client file system is layered on top of one or more of the logical volumes and numerous files, directories, and/or other data containers are created and stored within this client file system. Data is then managed by the client in terms of the logical volumes and files built onto the client file system. In such environments, the storage system is generally unaware of the client file system and the data constructs therein. In particular, the storage system is generally unaware of which storage system storage blocks/units are mapped to (i.e., correlate with) which client file system files.

In addition, certain file systems, including the exemplary write anywhere file layout (WAFL®) file system available from Network Appliance, Inc, of Sunnyvale, Calif., include the capability to generate a thinly provisioned data container. As used herein, the term data container generally refers to a unit of storage for holding data, such as a file system, file, volume, or a LUN, which is addressable by, e.g., a unique identification. The thinly provisioned data container is often utilized in the exemplary WAFL file system environment when, for example, a vdisk (LUN) is initially generated. A user or administrator may generate a LUN of specified size, for example, 10 gigabytes (GB). This size represents the maximum addressable space of the vdisk. To increase system performance, the file system generally does not write the entire contents of the LUN to disk at the time of creation. Instead, the file system generates a thinly provisioned data container (i.e., file) representing the LUN. The thinly provisioned data container may then be populated (filled in) via subsequent write operations as the vdisk is filled in with data. While this description is written in terms of a thinly provisioned data container over and underlying file system, it should be noted that other thin provisioning implementations may be utilized. As such, the use of an underlying file system to support a thinly provisioned data container should be taken as an example only.

FIG. 1 is a schematic block diagram of an (inode structure) buffer tree 100 of an exemplary thinly provisioned data container. This (inode) buffer tree structure 100 is created when, for example, a LUN is first created by the file system as thinly provisioned. In a typical thinly provisioned data container, only the inode 105 is actually written to disk at creation. The remainder of the data container is not written to or otherwise physically stored on the disks at that time. That is, the data container 100 includes an inode 105, however, it does not contain indirect blocks 110, 120 or file data blocks 125 (as shown in phantom). Thus, these phantom blocks (i.e., 110, 120, 125) are not generated when the data container is created, although, they will be written to disk as the data container is populated. By only writing the inode to disk when a thinly provisioned data container is generated, substantial time is saved as the number of disk accesses is reduced. Additionally, only the storage space on the disks that is needed to hold the contents of the data container is utilized. Illustratively, the file system will make appropriate space reservations to ensure that the entire thinly provisioned data container may be written to disk. Space reservation techniques are described in U.S. Pat. No. 7,577,692, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, et al., issued on Aug. 18, 2009.

FIG. 2 is a schematic block diagram of an exemplary (inode) buffer tree structure 200 of a partially filled in thinly provisioned data container that includes original inode 105. Here, indirect blocks 210, 220 and exemplary file data block 225 have been populated (filled in) in response to one or more write operations to the data container. Continued write operations will result in filling in additional data blocks, for example, file data block 325 as shown in the exemplary (inode) buffer tree structure 300 of FIG. 3. Eventually, when the data container has been completely filled, all blocks, including such blocks as indirect blocks 420 and associated file data blocks (not shown) will be completed as illustrated in the schematic block diagram of an exemplary inode structure 400 in FIG. 4. At such time, the thinly provisioned data container has been completely filled in and each block is associated with an actual block on disk.

A known environment for utilizing a storage system with a thinly provisioned data container, e.g., a thinly provisioned LUN, involves overlaying a host file system (a client of the storage system) onto the thinly provisioned LUN. In such an environment, the client includes a client file system that utilizes the exported LUN as storage and maintains structured storage, e.g., a file system, on the blocks of the LUN. However, a noted disadvantage is that the client file system does not communicate status to the storage system concerning the deletion or deallocation of blocks within the LUN. Although the client file system typically records appropriate metadata entries when a file is deleted, no status message is passed to the storage system that notifies the system that certain blocks of the LUN are no longer in use. Thus, while the LUN may dynamically grow by allocating additional blocks (up to its maximum number of addressable blocks) as needed, the storage system will not deallocate blocks as files are deleted in the client file system. For example, if a LUN is generated with a maximum size of 100 GB and then a 50 GB file is written to the LUN by the client file system, the storage system will allocate 50 GB of space for the LUN. If the 50 GB file is thereafter deleted in the client file system, that file system records appropriate metadata entries and frees its file system pointers. However, the LUN will still occupy 50 GB of space on the storage system, even though the 50 GB is now unused space within the LUN.

One technique that may be used to reclaim unused storage space from a thinly provisioned data container is described in commonly-owned, copending U.S. Pat. No. 7,603,532, entitled SYSTEM AND METHOD FOR RECLAIMING UNUSED SPACE FROM A THINLY PROVISIONED DATA CONTAINER, filed by Vijayan Rajan et al. issued on Oct. 13, 2009. As described therein, a host (client) side agent on the client file system may be used to assist the storage system in reclaiming unused storage space. However, this solution requires intervention/participation from the client file system. There remains a need, therefore, for a system and method for reclaiming unused storage space from a thinly provisioned data container of a storage system, particularly a system and method that do not require assistance from the client file system.

SUMMARY OF THE INVENTION

The disadvantages of the prior art are overcome by providing a system and method for reclaiming unused storage space from a data container of a storage system. In particular, a novel technique is provided that allows the storage system to reclaim storage space of the data container not used by a client file system for which the storage system maintains storage, without requiring assistance from that file system to determine storage usage. In other words, the storage system may independently reclaim storage space not used by the client file system, without that file system's intervention.

In accordance with one or more embodiments of the present invention, the storage system determines a storage mapping between storage units of the client file system and storage units of the storage system, and also determines the client file system representation of storage unit usage. With that representation, the storage system may determine the client file system storage units that are unused, and, by employing the storage mapping, may correlate these unused client file system storage units with corresponding storage system storage units. To reclaim unused storage space from the data container, the storage system may then deallocate the storage system storage units correlated with the unused file system storage units, accordingly. In addition, the mapping to the deallocated storage system storage units may be removed in order to prevent access to those deallocated units.

According to one aspect of the present invention, the data container on the storage system may comprise a read-only image of the client file system, such as, e.g., a snapshot or a persistent consistency point image (PCPI) of the client file system at a particular point in time. By reclaiming unused storage space of a PCPI, the storage system may ensure that the client file system is not concurrently using previously deallocated storage units on the storage system (that is, because the storage system acts without client file system participation). Various mechanisms may be used to maintain the integrity of the PCPI, i.e., to reclaim the unused space without affecting the read-only features of the PCPI (e.g., such as removing the mapping to the deallocated storage system storage units, without modifying the read-only guarantees of the data container).

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 8 is a schematic block diagram of an exemplary buffer tree in accordance with an embodiment of the invention;

FIG. 9 is a schematic block diagram of an exemplary buffer tree in accordance with an embodiment of the present invention;

DETAILED DESCRIPTION OF AN ILLUSTRATIVE EMBODIMENT

The present invention is directed to a system and method for reclaiming unused storage space from a data container of a storage system. In particular, a novel technique is provided that allows the storage system to reclaim storage space of the data container not used by a client file system for which the storage system maintains storage, without requiring assistance from that file system to determine storage usage. In other words, the storage system may independently reclaim storage space not used by the client file system, without that file system's intervention.

A. Storage System

The present invention may be implemented, in the illustrative embodiment, on a storage appliance that serves both file and block protocol access to information stored on storage devices in an integrated manner. In this context, the term storage appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (LUN) emulation.

Figure 1:
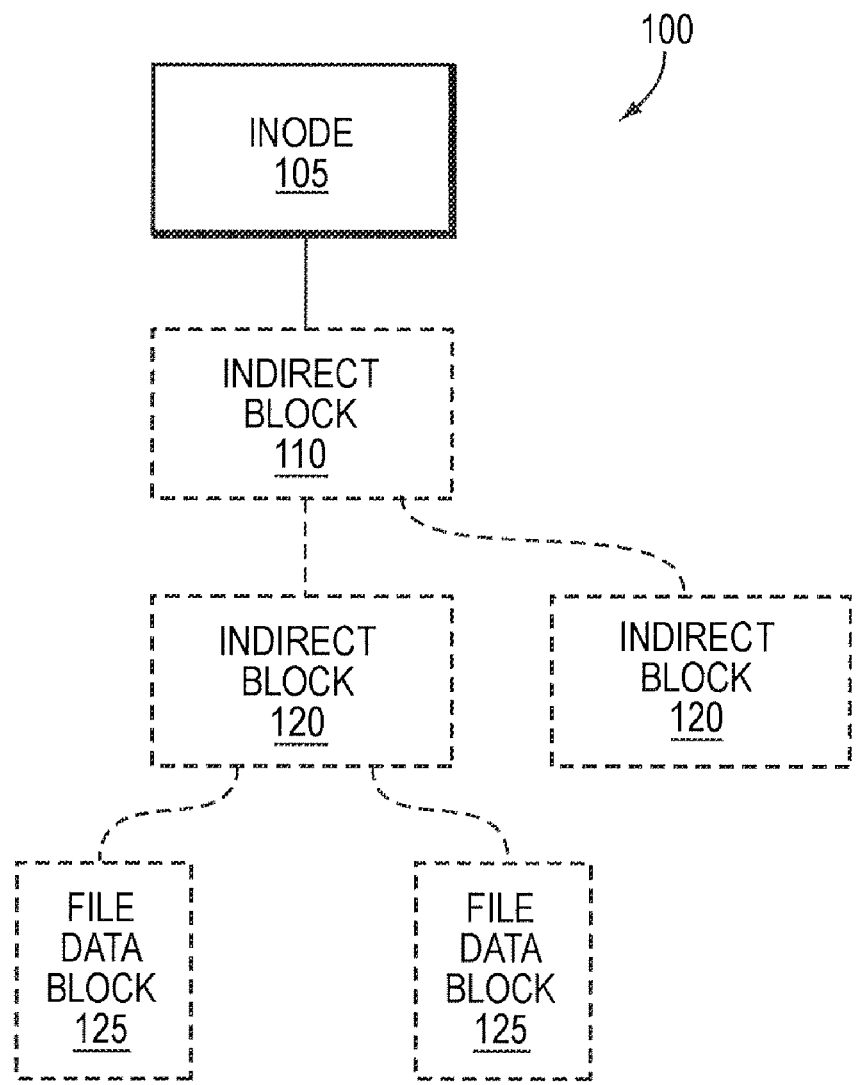
FIG. 1, already described, is a schematic block diagram of an exemplary thinly provisioned data container showing an inode for the data container.
Figure 2:
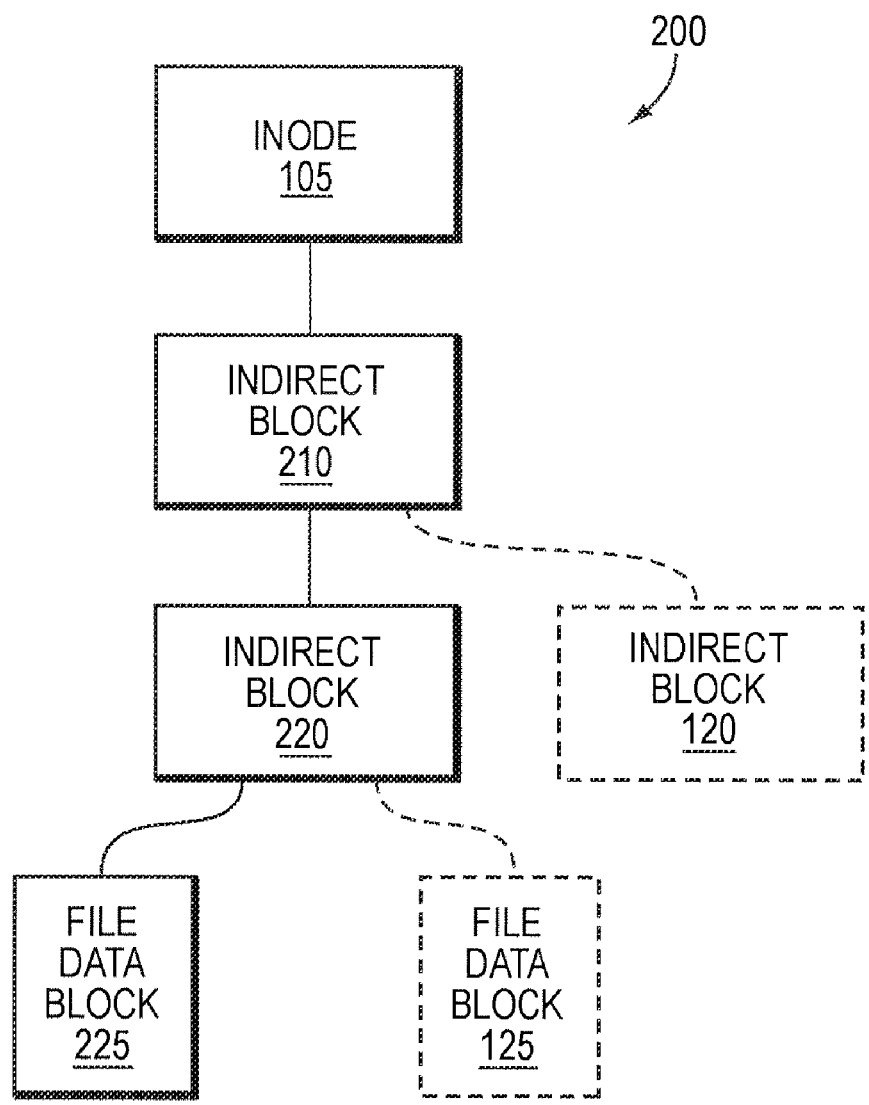
FIG. 2, already described, is a schematic block diagram of a partially filled in thinly provisioned data container in accordance with an embodiment of the present invention.
Figure 3:
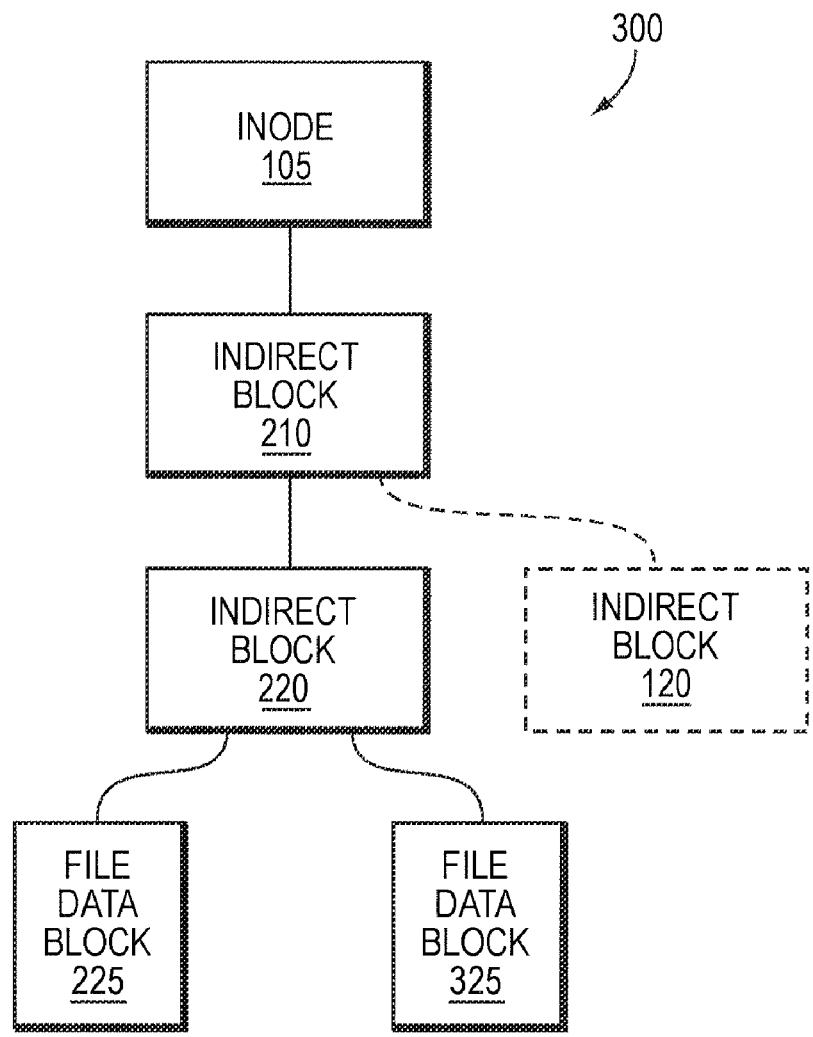
FIG. 3, already described, is a schematic block diagram of a an exemplary partially filled in thinly provisioned data container in accordance with an embodiment of the present invention.
Figure 4:
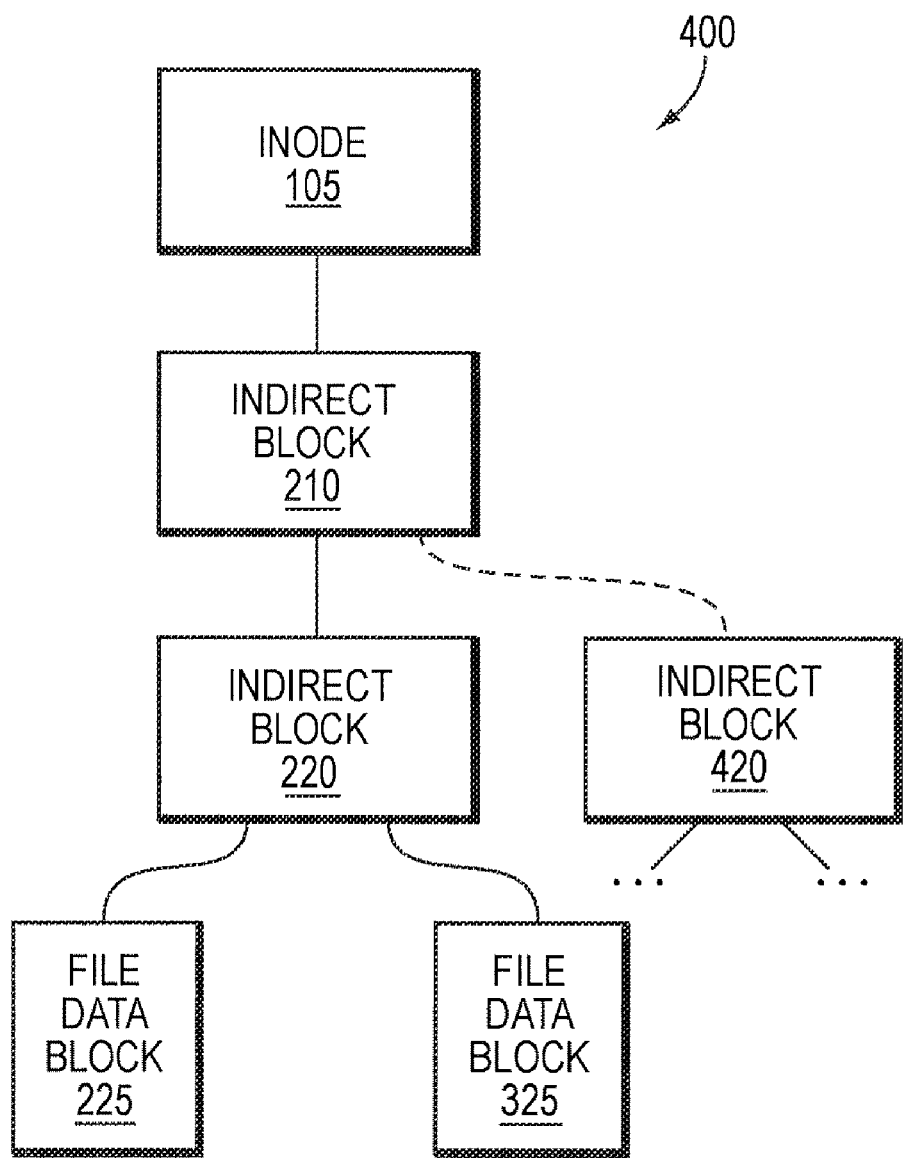
FIG. 4, already described, is a schematic block diagram of an exemplary filled in data container in accordance with an embodiment of the present invention.
Figure 5:
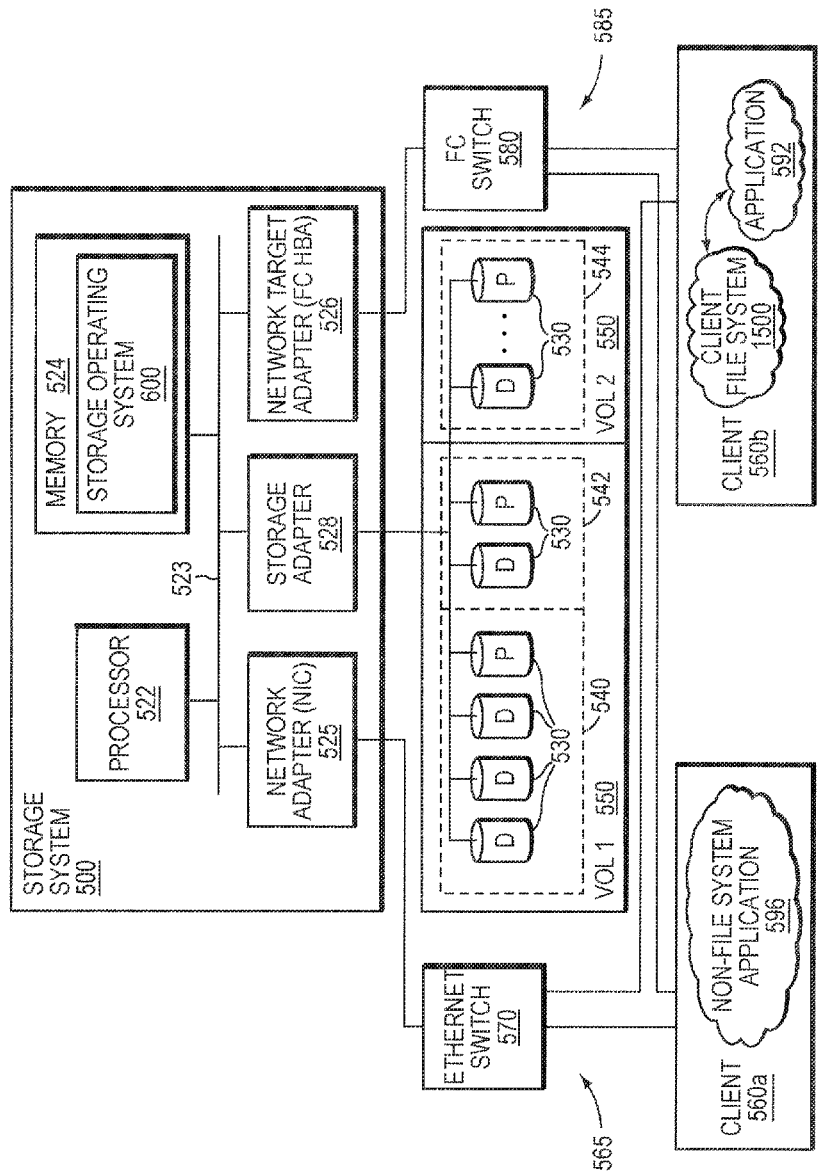
FIG. 5 is a schematic block diagram of an exemplary storage system in accordance with an embodiment of the present invention.

FIG. 5 is a schematic block diagram of a storage appliance configured to provide storage service relating to the organization of information on storage devices, such as disks 530. The storage appliance is illustratively embodied as a storage system 500 comprising a processor 522, a memory 524, a plurality of network adapters 525, 526, and a storage adapter 528 interconnected by a system bus 523. The storage system 500 also includes a storage operating system 600 that provides a virtualization system (and, in particular, a file system) to logically organize the information as a hierarchical structure of named directory, file, and virtual disk (vdisk) storage objects on the disks 530.

Whereas clients of a NAS-based network environment have a storage viewpoint of files, the clients of a SAN-based network environment have a storage viewpoint of blocks or disks. To that end, the storage system 500 presents (exports) disks to SAN clients through the creation of logical unit numbers (LUNs) or vdisk objects. A vdisk object (hereinafter "vdisk") is a special file type that is implemented by the virtualization system and translated into an emulated disk as viewed by the SAN clients. The storage system thereafter makes these vdisks accessible to the SAN clients on LUNs through controlled exports, as described further herein.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the inventive system and method described herein.

The network adapter 525 couples the storage system to a plurality of clients 560a,b over point-to-point links, wide area networks, virtual private networks implemented over a public network (Internet) or a shared local area network, hereinafter referred to as an illustrative Ethernet network 565. Therefore, the network adapter 525 may comprise a network interface card (NIC) having the mechanical, electrical and signaling circuitry needed to connect the storage system to a network switch, such as a conventional Ethernet switch 570. For this NAS-based network environment, the clients are configured to access information stored on the storage system as files. The clients 560 communicate with the storage system over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 560 may request the services of the storage system 500 by issuing file access protocol messages (in the form of packets) to the appliance over the network 565. It will be apparent to those skilled in the art that other clients running other types of operating systems may also communicate with the storage system using other file access protocols.

Illustratively, client (or host) 560b includes a client file system 1500 that interfaces with one or more applications 592. The client file system 1500 is illustratively overlaid onto a data container (such as a LUN) served by the storage system. For example, the storage system may export the LUN, which the client file system 1500 utilizes to store data. Alternately, a non-file system application 596 executing on client 560a may comprise a database system or other system.

The storage network "target" adapter 526 also couples the multi-protocol storage system 500 to clients 560 that may be further configured to access the stored information as blocks or disks. For this SAN-based network environment, the storage system is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the storage system 500 to a SAN network switch, such as a conventional FC switch 580. In addition to providing FC access, the FC HBA may offload Fibre Channel network processing operations for the storage system.

The clients 560 generally utilize block-based access protocols, such as the Small Computer Systems Interface (SCSI) protocol, when accessing information (in the form of blocks, disks or LUNs) over a SAN-based network. SCSI is a peripheral input/output (I/O) interface with a standard, device independent protocol that allows different peripheral devices, such as disks 530, to attach to the storage system 500. In SCSI terminology, clients 560 operating in a SAN environment are initiators that initiate requests and commands for data. The storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage system 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage system 500) by issuing iSCSI and FCP messages over the network 565, 585 to access information stored on the disks. It will be apparent to those skilled in the art that the clients may also request the services of the storage system using other block access protocols. By supporting a plurality of block access protocols, the storage system provides a unified and coherent access solution to vdisks/LUNs in a heterogeneous SAN environment.

The storage adapter 528 cooperates with the storage operating system 600 executing on the storage system to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the system 500 is preferably implemented as one or more storage volumes (e.g., VOL 1-2 550) that comprise a cluster of physical storage disks 530, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed.

B. Storage Operating System

To facilitate access to the disks 530, the storage operating system 600 may implement a write-anywhere file system of a virtualization system that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow vdisks/LUNs and exports to persist over, e.g., reboot operations, while also enabling management of the vdisk/LUN as a single disk object in relation to SAN clients. An example of a vdisk and its associated inodes that may be advantageously used with the present invention is described in U.S. Pat. No. 7,107,385, entitled STORAGE VIRTUALIZATION BY LAYERING VIRTUAL DISK OBJECTS ON A FILE SYSTEM, by Vijayan Rajan, et al. issued on Sep. 12, 2006, by which application is hereby incorporated by reference as though fully set forth herein.

In accordance with an illustrative embodiment of the present invention, when a vdisk is generated it is typically created as a thinly provisioned data container. However, the storage operating system reserves the appropriate amount of storage space to fill the "holes" of the newly generated vdisk. This space reservation technique ensures that there is sufficient space on the disks to completely fill in the data container. Exemplary space reservation policies and techniques are further described in U.S. Pat. No. 7,577,692, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, et al. issued on Aug. 18, 2009.

In the illustrative embodiment, the storage operating system is preferably the NetApp® Data ONTAP® operating system available from Network Appliance, Inc., of Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage system, implement data access semantics, such as the Data ONTAP storage operating system, which is implemented as a microkernel. The storage operating system can also be implemented as an application program operating over a general-purpose operating system, such as UNIX®, or Windows NT® or XP®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage (NAS) environment, a storage area network (SAN), and a disk assembly directly-attached to a client or host computer. The term "storage system" should therefore be taken broadly to include such arrangements in addition to any subsystems configured to perform a storage function and associated with other equipment or systems.

Figure 6:
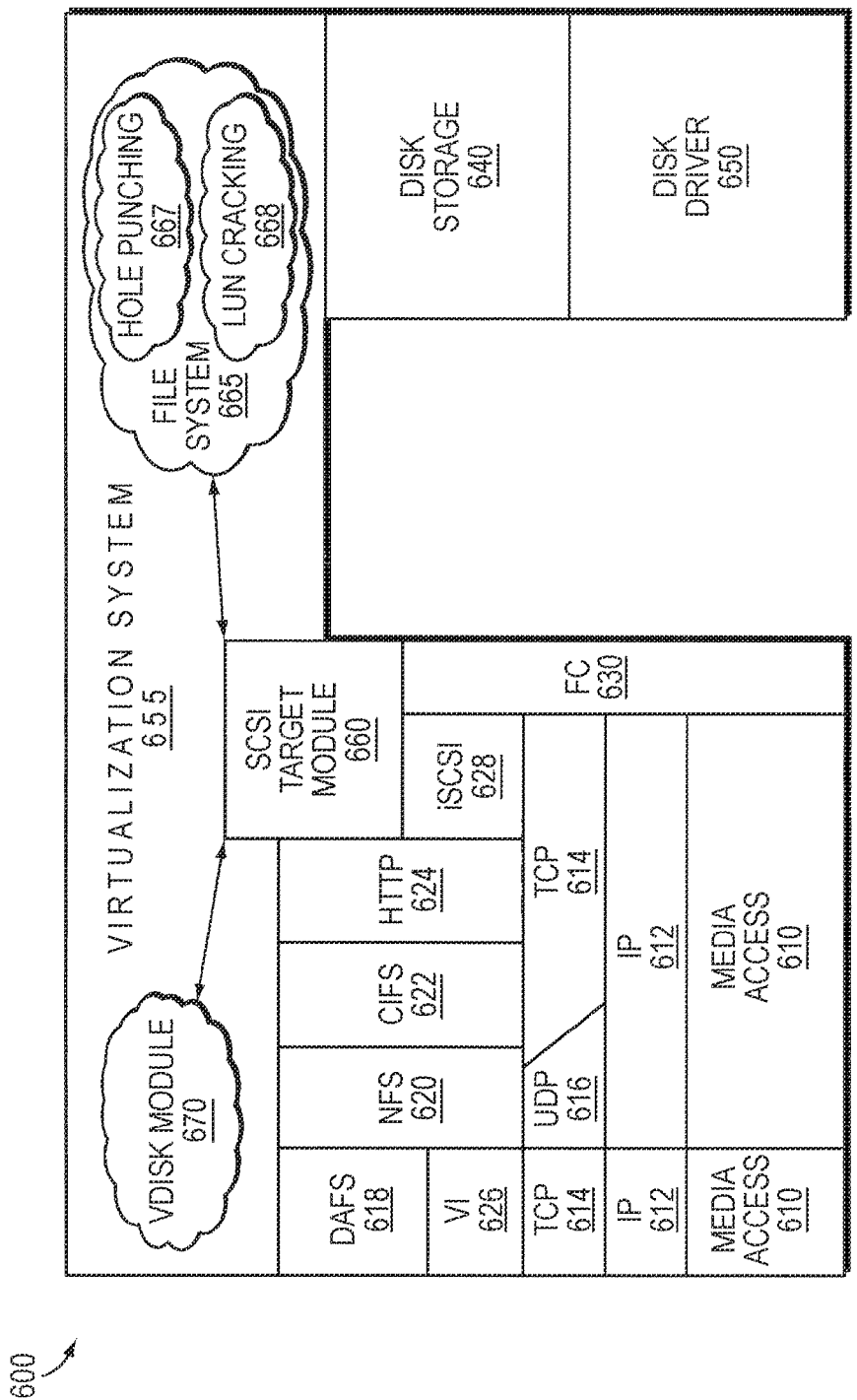
FIG. 6 is a schematic block diagram of an exemplary storage operating system for use with the storage system of FIG. 5 in accordance with an embodiment of the present invention.

FIG. 6 is a schematic block diagram of an exemplary storage operating system 600 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A Virtual Interface (VI) layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the storage system. The FC and iSCSI drivers provide FC-specific and iSCSI-specific access control to the LUNs (vdisks) and, thus, manage exports of vdisks to either iSCSI or FCP or, alternatively, to both iSCSI and FCP when accessing a single vdisk on the storage system. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 cooperating with virtualization modules illustratively embodied as, e.g., vdisk module 670 and SCSI target module 660, in order to virtualize storage and data as described herein. (Notably, while an illustrative embodiment for a virtualization system 655 is shown, other aspects of the operating system 600 may be incorporated within the virtualization system as well as other protocols/components not shown.) Also, as described below, a hole punching process 667 and a LUN cracking process 667 may be operative in conjunction with the file system 665 in accordance with the present invention. It should be noted that the vdisk module 670, file system 665, and SCSI target module 660 can be implemented in software, hardware, firmware, or a combination thereof. The vdisk module 670 is layered on (and interacts with) the file system 665 to provide a data path from the block-based SCSI target module to blocks managed by the file system. In essence, the vdisk module 670 manages SAN deployments by, among other things, implementing a comprehensive set of vdisk (LUN) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or LUN by providing a mapping procedure that translates logical block access to LUNs specified in access requests into virtual block access to the special vdisk file types and, for responses to the requests, vdisks into LUNs. The SCSI target module is illustratively disposed between the FC and iSCSI drivers 630, 628 and the file system 665 to thereby provide a translation layer of the virtualization system 655 between the SAN block (LUN) space and the file system space, where LUNs are represented as vdisks.

The file system 665 illustratively implements the above-described WAFL file system having an on-disk format representation that is block-based using, e.g., 4 kilobyte (kB) blocks and using inodes to describe the files. Broadly stated, all inodes of the file system are organized into the inode file. A file system (fs) info block specifies the layout of information in the file system and includes an inode of a file that includes all other inodes of the file system. Each volume has an fsinfo block that is preferably stored at a fixed location within, e.g., a RAID group of the file system. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the storage system may alternatively be implemented in hardware. That is, in an alternate embodiment of the invention, a storage access request data path through the operating system layers (including the virtualization system 655) may be implemented as logic circuitry embodied within a field programmable gate array (FPGA) or an application specific integrated circuit (ASIC). This type of hardware implementation increases the performance of the storage service provided by system 500 in response to a file access or block access request issued by a client 560. Moreover, in another alternate embodiment of the invention, the processing elements of network and storage adapters 525-528 may be configured to offload some or all of the packet processing and storage access operations, respectively, from processor 522 to thereby increase the performance of the storage service provided by the multi-protocol storage system. It is expressly contemplated that the various processes, architectures, and procedures described herein can be implemented in hardware, firmware, or software.

C. File System Organization

Figure 7:
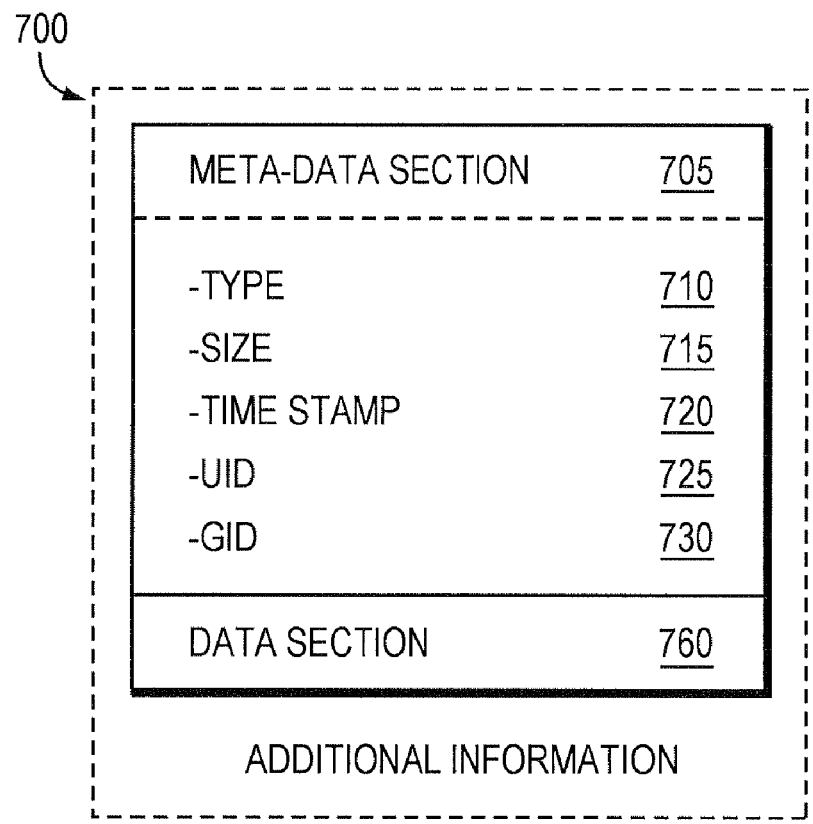
FIG. 7 is a schematic block diagram of an exemplary inode in accordance with an embodiment of the present invention.

In the illustrative embodiment, a data container is represented in the write-anywhere file system as an inode data structure adapted for storage on the disks 530. FIG. 7 is a schematic block diagram of an inode 700, which preferably includes a meta-data section 705 and a data section 760. The information stored in the meta-data section 705 of each inode 700 describes the data container (e.g., a file) and, as such, includes the type (e.g., regular, directory, vdisk) 710 of file, its size 715, time stamps (e.g., access and/or modification time) 720 and ownership, i.e., user identifier (UID 725) and group ID (GID 730), of the file. The contents of the data section 760 of each inode may be interpreted differently depending upon the type of file (inode) defined within the type field 710. For example, the data section 760 of a directory inode contains meta-data controlled by the file system, whereas the data section of a regular inode contains file system data. In this latter case, the data section 760 includes a representation of the data associated with the file.

Specifically, the data section 760 of a regular on-disk inode may include file system data or pointers, the latter referencing 4 KB data blocks on disk used to store the file system data. Each pointer is preferably a logical vbn (virtual block number) to facilitate efficiency among the file system and the RAID system (disk storage 640) when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 760 of the inode (e.g., a second level inode) references an indirect block (e.g., a first level L1 block) that contains 1024 pointers, each of which references a 4 KB data block on disk. For file system data having a size greater than 64 MB, each pointer in the data section 760 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 530 into the memory 524.

When an on-disk inode (or block) is loaded from disk 530 into memory 524, its corresponding in-core structure embeds the on-disk structure. For example, the dotted line surrounding the inode 700 indicates the in-core representation of the on-disk inode structure. The in-core structure is a block of memory that stores the on-disk structure plus additional information needed to manage data in the memory (but not on disk). The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

FIG. 8 is a schematic block diagram of an embodiment of a buffer tree of a file that may be advantageously used with the present invention. The buffer tree is an internal representation of blocks for a file (e.g., file 800) loaded into the memory 524 and maintained by the write-anywhere file system 665. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pointers 805 that ultimately reference data blocks 806 used to store the actual data of the file. That is, the data of file 800 are contained in data blocks and the locations of these blocks are stored in the indirect blocks of the file. Each level 1 indirect block 804 may contain pointers to as many as 1024 data blocks. According to the "write anywhere" nature of the file system, these blocks may be located anywhere on the disks 530.

A file system layout is provided that apportions an underlying physical volume into one or more virtual volumes (or flexible volume) of a storage system, such as storage system 500. An example of such a file system layout is described in U.S. Pat. No. 7,409,494, titled EXTENSION OF WRITE ANYWHERE FILE SYSTEM LAYOUT, by John K.

Edwards et al. issued on Aug. 5, 2008, and assigned to Network Appliance, Inc. The underlying physical volume is an aggregate comprising one or more groups of disks, such as RAID groups, of the system. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file (described further below) is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 800) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn (disk block number) occurs at the file system/RAID system boundary of the storage operating system 600.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 9 is a schematic block diagram of an illustrative embodiment of a buffer tree of a file 900 that may be advantageously used with the present invention. A root (top-level) inode 902, such as an embedded Mode, references indirect (e.g., level 1) blocks 904. Note that there may be additional levels of indirect blocks (e.g., level 2, level 3) depending upon the size of the file. The indirect blocks (and Mode) contain pvbn/vvbn pointer pair structures 908 that ultimately reference data blocks 906 used to store the actual data of the file.

The pvbns reference locations on disks of the aggregate, whereas the vvbns reference locations within files of the flexible volume. The use of pvbns as block pointers 908 in the indirect blocks 904 provides efficiencies in the read paths, while the use of vvbn block pointers provides efficient access to required meta-data. That is, when accessing a block of a file, the parent indirect block in the file contains readily available vvbn block pointers, which avoids the latency associated with accessing an owner map to perform pvbn-to-vvbn translations; yet, on the read path, the pvbn is available.

Figure 10:
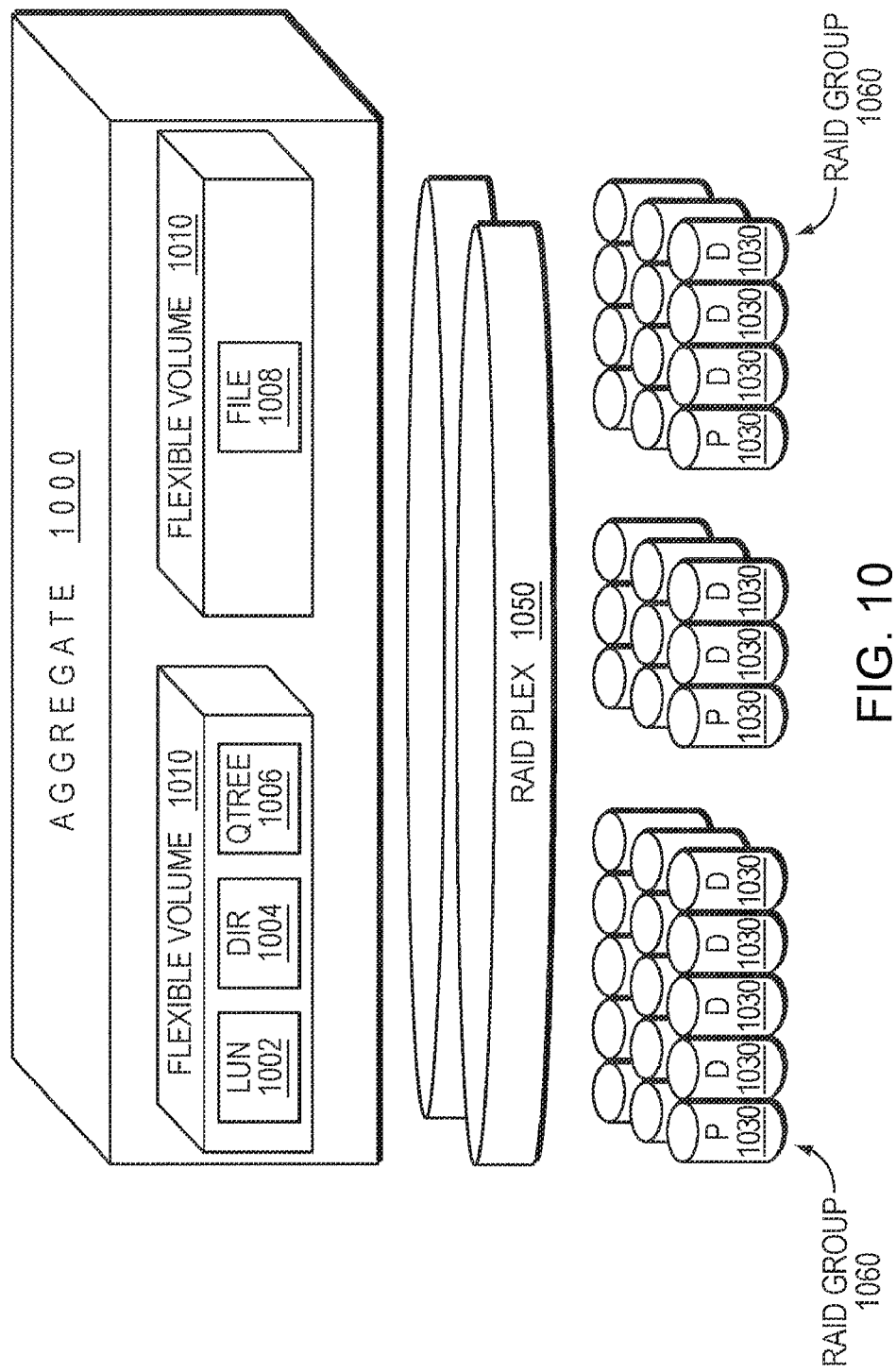
FIG. 10 is a schematic block diagram of an exemplary aggregate in accordance with an embodiment of the present invention.

FIG. 10 is a schematic block diagram of an embodiment of an aggregate 1000 that may be advantageously used with the present invention. LUNs (blocks) 1002, directories 1004, qtrees 1006, and files 1008 may be contained within flexible volumes 1010, such as dual vbn flexible volumes, that, in turn, are contained within the aggregate 1000. The aggregate 1000 is illustratively layered on top of the RAID system, which is represented by at least one RAID plex 1050 (depending upon whether the storage configuration is mirrored), wherein each plex 1050 comprises at least one RAID group 1060. Each RAID group further comprises a plurality of disks 1030, e.g., one or more data (D) disks and at least one (P) parity disk.

Whereas the aggregate 1000 is analogous to a physical volume of a conventional storage system, a flexible volume is analogous to a file within that physical volume. That is, the aggregate 1000 may include one or more files, wherein each file contains a flexible volume 1010 and wherein the sum of the storage space consumed by the flexible volumes is physically smaller than (or equal to) the size of the overall physical volume. The aggregate utilizes a physical pvbn space that defines a storage space of blocks ("storage system storage units" as used herein) provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 1010 is also a logical volume, it has its own block allocation structures (e.g., active, space, and summary maps) in its vvbn space.

A container file is a file in the aggregate that contains all blocks used by a flexible volume. The container file is an internal (to the aggregate) feature that supports a flexible volume (illustratively, there is one container file 1153 per flexible volume), and contains a mapping of vvbns of the corresponding flexible volume to pvbns of the aggregate (vvbn-to-pvbn mapping). For example, the container file may comprise an index (e.g., list) of vvbn-to-pvbn mappings for the flexible volume, which may generally correlate to the level 1 indirect blocks of the flexible volume organized as a container map with vvbn/pvbn pairs. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created, or being destroyed, etc.

Figure 11:
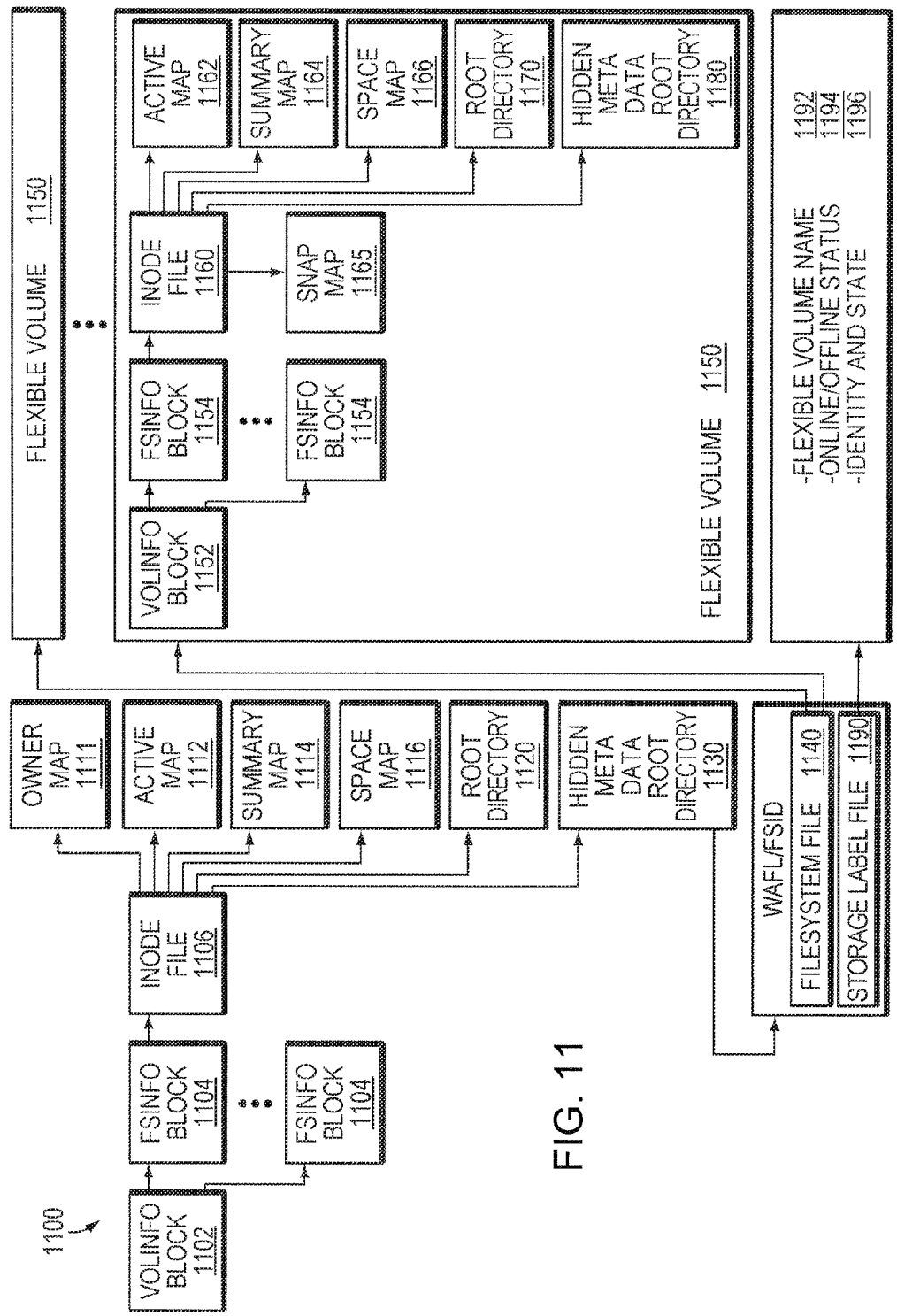
FIG. 11 is a schematic block diagram of an exemplary on-disk data structure of an aggregate in accordance with an embodiment of the present invention.

FIG. 11 is a schematic block diagram of an on-disk representation of an aggregate 1100. The storage operating system 600, e.g., the RAID system (disk storage 640), assembles a physical volume of pvbns to create the aggregate 1100, with pvbns 1 and 2 comprising a "physical" volinfo block 1102 for the aggregate. The volinfo block 1102 contains block pointers to fsinfo blocks 1104, each of which may represent a snapshot of the aggregate. Each fsinfo block 1104 includes a block pointer to an inode file 1106 that contains inodes of a plurality of files, including an owner map 1110, an active map 1112, a summary map 1114, and a space map 1116, as well as other special meta-data files. In particular, the active map 1112 of the aggregate contains a map (e.g., a bitmap) of the pvbns of the aggregate that indicates allocation (allocated or unallocated) of each pvbn of the active file system of the aggregate.

The inode file 1106 further includes a root directory 1120 and a "hidden" meta-data root directory 1130, the latter of which includes a namespace having files related to a flexible volume in which users cannot "see" the files. The hidden meta-data root directory includes the WAFL/fsid/ directory structure that contains filesystem file 1140 and storage label file 1190. Note that root directory 1120 in the aggregate is empty; all files related to the aggregate are organized within the hidden meta-data root directory 1130.

In addition to being embodied as a container file having level 1 blocks organized as a container map, the filesystem file 1140 includes block pointers that reference various file systems embodied as flexible volumes 1150. The aggregate 1100 maintains these flexible volumes 1150 at special reserved inode numbers. Each flexible volume 1150 also has special reserved inode numbers within its flexible volume space that are used for, among other things, the block allocation bitmap structures. As noted, the block allocation bitmap structures, e.g., active map 1162, summary map 1164, snap map 1165, and space map 1166, are located in each flexible volume. In particular, the active map 1162 of a file system contains a map (e.g., a bitmap) of the vvbns of the flexible volume corresponding to that file system that indicates allocation (allocated or unallocated) of each vvbn of the active file system of the flexible volume.

Specifically, each flexible volume 1150 has the same inode file structure/content as the aggregate, with the exception that there is no owner map and no WAFL/fsid/filesystem file, storage label file directory structure in a hidden meta-data root directory 1180. To that end, each flexible volume 1150 has a volinfo block 1152 that points to one or more fsinfo blocks 1154, each of which may represent a snapshot active file system of the flexible volume. Each fsinfo block, in turn, points to an inode file 1160 that, as noted, has the same inode structure/content as the aggregate with the exceptions noted above. Each flexible volume 1150 has its own inode file 1160 and distinct inode space with corresponding inode numbers, as well as its own root (fsid) directory 1170 and subdirectories of files that can be exported separately from other flexible volumes.

The storage label file 1190 contained within the hidden meta-data root directory 1130 of the aggregate is a small file that functions as an analog to a conventional raid label. A raid label includes physical information about the storage system, such as the volume name; that information is loaded into the storage label file 1190. Illustratively, the storage label file 1190 includes the name 1192 of the associated flexible volume 1150, the online/offline status 1194 of the flexible volume, and other identity and state information 1196 of the associated flexible volume (whether it is in the process of being created or destroyed).

It should be noted that while the present invention is described in terms of aggregates and flexible volumes, the principles of the present invention may be applied to other file system organizations. As such, the description of aggregates and flexible volumes should be taken as exemplary only.

D. Persistent Consistency Point Images

The file system illustratively has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point image (PCPI). A (PCPI) is a space conservative, point-in-time read-only image of data accessible by name that provides a consistent image of that data (such as a storage system) at some previous time. More particularly, a PCPI is a point-in-time representation of a storage element, such as an active file system, file, volume, or database, stored on a storage device (e.g., on disk) or other persistent memory and having a name or other identifier that distinguishes it from other PCPIs taken at other points in time.

In the case of the write anywhere file system, a PCPI is always an active file system image that contains complete information about the file system, including all metadata. A PCPI can also include other information (meta-data) about the active file system at the particular point in time for which the image is taken. The terms "PCPI" and "snapshot" may be used interchangeably through out this patent without derogation of Network Appliance's trademark rights. In the example of a WAFL file system, PCPIs are described in TR3002 File System Design for a NFS File Server System by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

Figure 12:
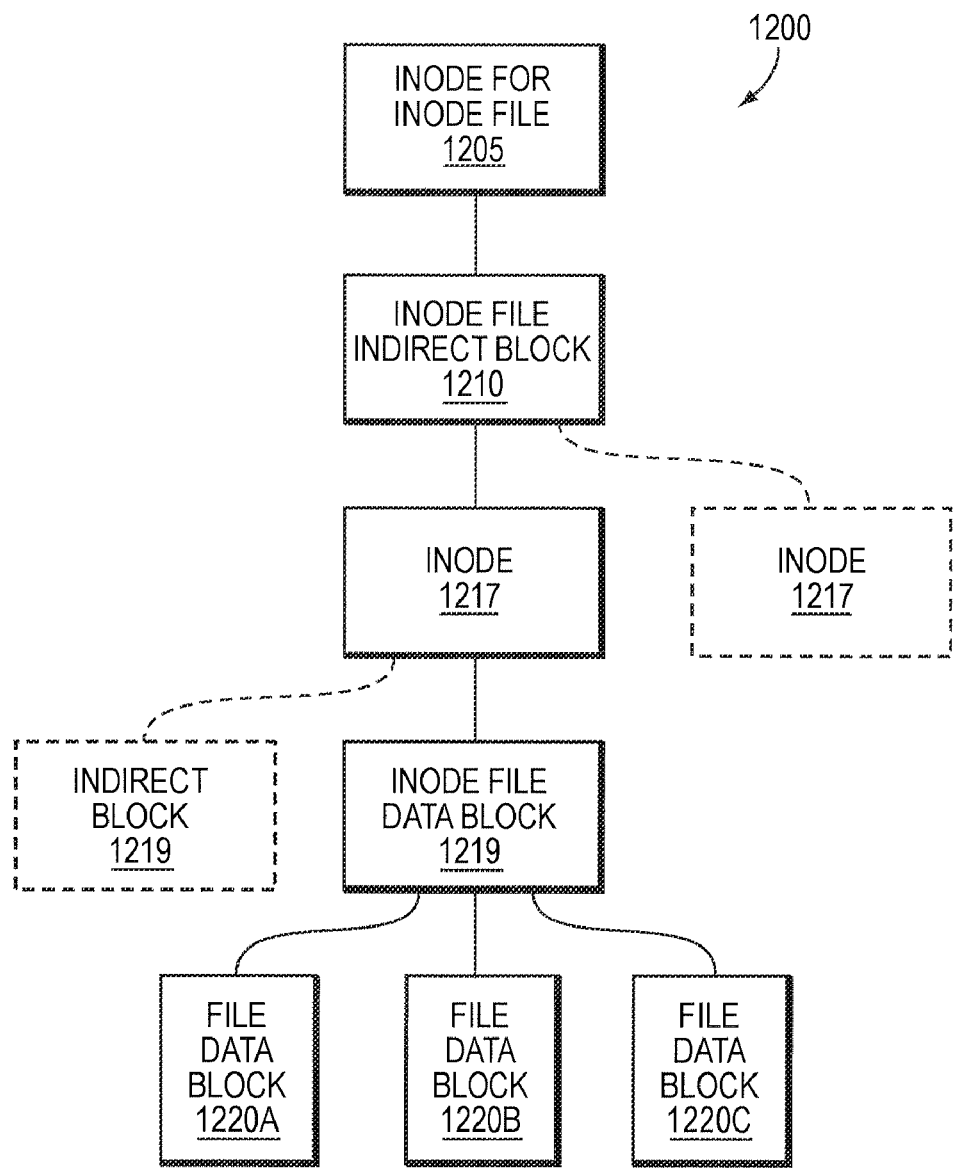
FIG. 12 is a schematic block diagram of an on-disk buffer tree in accordance with an embodiment of the present invention.

Broadly stated, a PCPI is stored on-disk along with the active file system, and is called into the memory of the storage system as requested by the storage operating system. The on-disk organization of the snapshot and the active file system can be understood from the following description of an exemplary file system inode structure 1200 shown in FIG. 12. The inode for an inode file 1205 contains information describing the inode file associated with a file system. In this exemplary file system inode structure, the inode for the inode file 1205 contains a pointer that references (points to) an inode file indirect block 1210. The inode file indirect block 1210 contains a set of pointers that reference inode file blocks, each of which contains an array of inodes 1217 which, in turn, contain pointers to indirect blocks 1219. The indirect blocks 1219 include pointers to file data blocks 1220A, 1220B, and 1220C. Each of the file data blocks 1220(A-C) is capable of storing, e.g., 4 KB of data.

Figure 13:
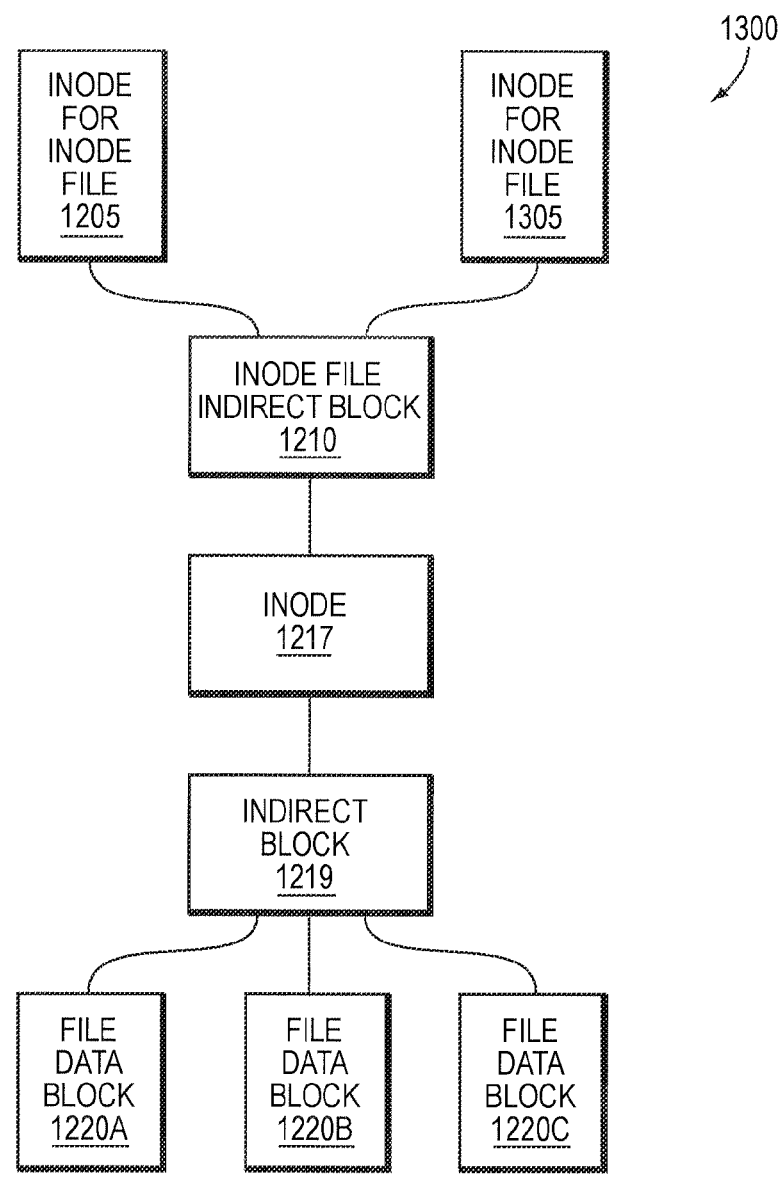
FIG. 13 is a schematic block diagram of an exemplary buffer tree showing the creation of a persistent consistency point image (PCPI) of a buffer tree.
Figure 14:
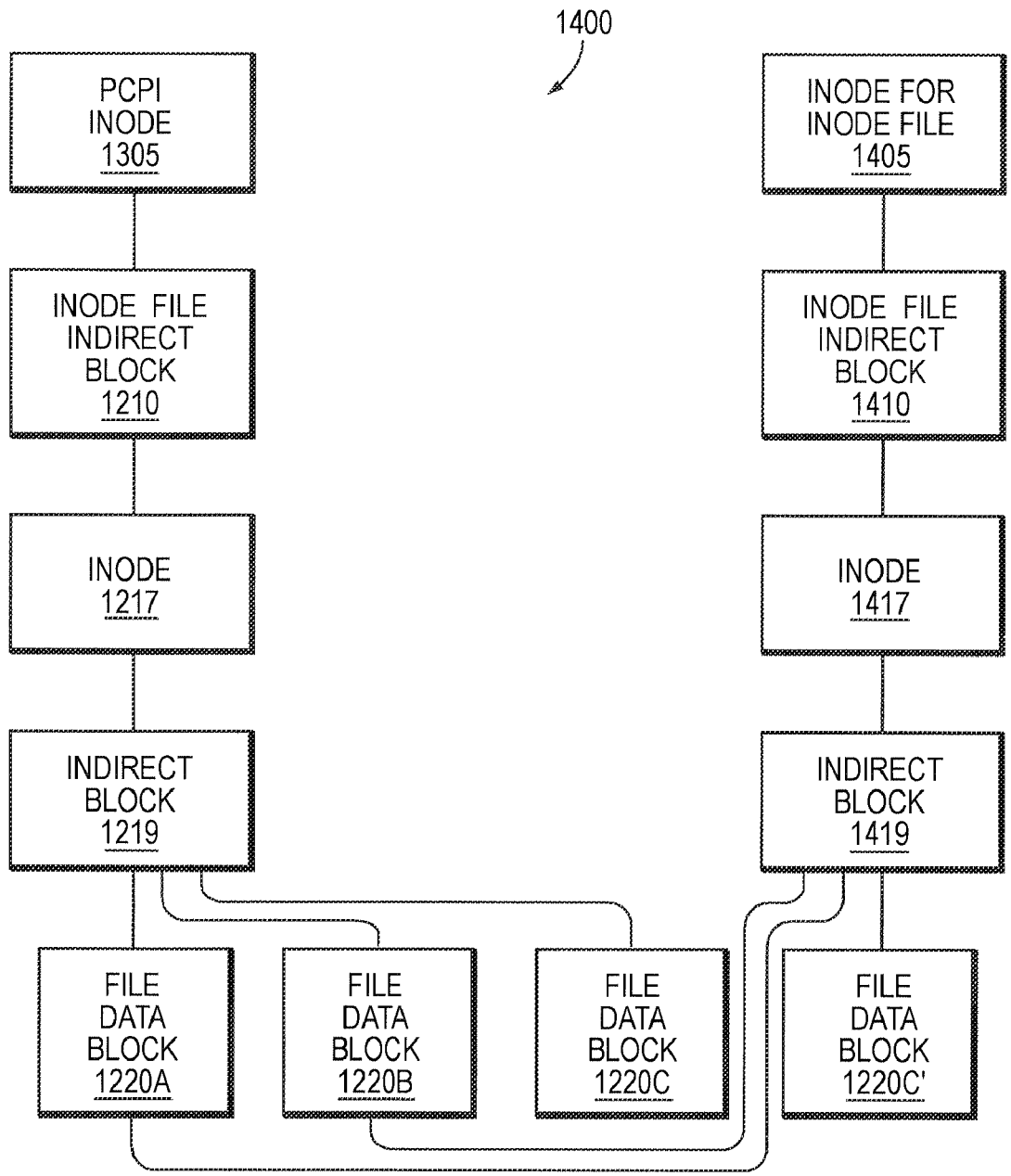
FIG. 14 is a schematic block diagram of an exemplary buffer tree and PCPI after new data has been written following the creation of a PCPI in accordance with an embodiment of the present invention.

When the file system generates a PCPI of its active file system, a PCPI inode is generated as shown in FIG. 13. The PCPI inode 1305 is, in essence, a duplicate copy of the inode for the inode file 1205 of the file system 1200 that shares common parts, such as inodes and blocks, with the active file system. For example, the exemplary file system structure 1200 includes the inode file indirect blocks 1210, inodes 1217, indirect blocks 1219 and file data blocks 1220A-C as in FIG. 12. When a user modifies a file data block, the file system writes the new data block to disk and changes the active file system to point to the newly created block. FIG. 14 shows an exemplary inode file system structure 1400 after a file data block has been modified. In this example, file data block 1220C is modified to file data block 1220C'. As a result, the contents of the modified file data block are written to a new location on disk as a function of the exemplary file system. Because of this new location, the indirect block 1419 must be rewritten. Due to this changed indirect block 1419, the inode 1417 must be rewritten. Similarly, the inode file indirect block 1410 and the inode for the inode file 1405 must be rewritten.

Thus, after a file data block has been modified the PCPI inode 1305 contains a pointer to the original inode file indirect block 1210 which, in turn, contains pointers through the inode 1217 and indirect block 1219 to the original file data blocks 1220A, 1220B and 1220C. The newly written indirect block 1419 also includes pointers to unmodified file data blocks 1220A and 1220B. That is, the unmodified data blocks in the file of the active file system are shared with corresponding data blocks in the PCPI file, with only those blocks that have been modified in the active file system being different than those of the PCPI file.

However, the indirect block 1419 further contains a pointer to the modified file data block 1220C' representing the new arrangement of the active file system. A new inode for the inode file 1405 is established representing the new structure 1400. Note that meta-data (not shown) stored in any snapshotted blocks (e.g., 1305, 1210, and 1220C) protects these blocks from being recycled or overwritten until they are released from all snapshots. Thus, while the active file system inode for the inode file 1405 points to new blocks 1410, 1417, 1419, and 1220C', the old blocks 1305, 1210, and 1220C are retained until the snapshot is fully released.

E. Reclaiming Unused Space from a Data Container

The present invention is directed to a system and method for reclaiming unused storage space from a data container, particularly to be performed by the storage system without intervention/assistance from the overlaid client file system. In accordance with one or more embodiments of the present invention, the storage system determines a storage mapping between storage units of the client file system and storage units of the storage system, and also determines the client file system representation of storage unit usage. With that representation, the storage system may determine the client file system storage units that are unused, and, by employing the storage mapping, may correlate those unused file system storage units with corresponding storage system storage units. To reclaim unused storage space from the data container, the storage system may then deallocate the storage system storage units correlated with the unused client file system storage units, accordingly. In addition, the mapping to the deallocated storage system storage units may be removed in order to prevent access to those deallocated units.

Figure 15:
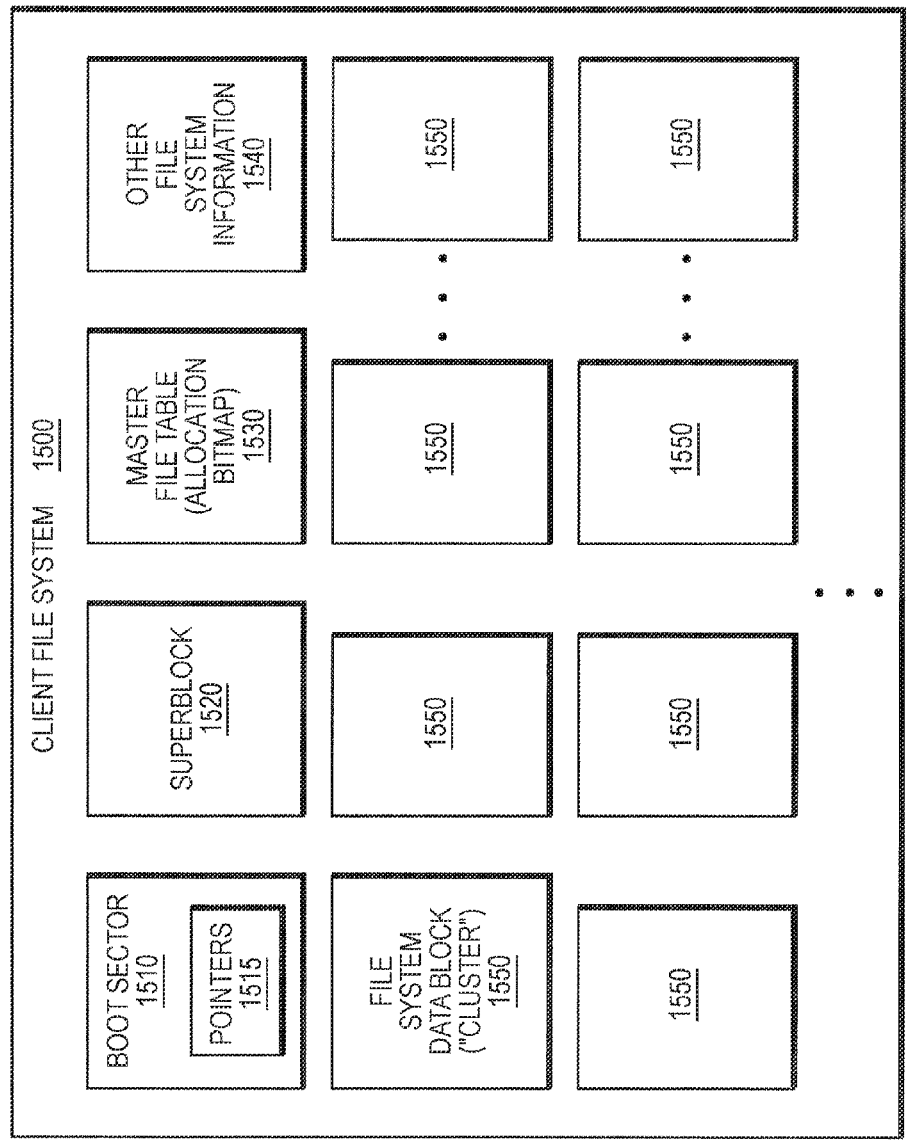
FIG. 15 is a schematic block diagram of an exemplary client file system that may be overlaid onto an exported data container in accordance with an embodiment of the present invention.

Illustratively, FIG. 15 illustrates an example client file system 1500 (590) that may be overlaid onto the exported data container, for example a flexible volume 1010/1150 (e.g., comprising one or more LUNs). For instance, the client file system 1500 may be organized into one or more data structures or blocks that are adapted to store information as configured by the file system (e.g., the New Technology File System, "NTFS", as will be understood by those skilled in the art). In particular, an illustrative client file system 1500 may comprise a boot sector/block 1510, a superblock 1520, a master file table (MFT) block 1530, other file system information block(s) 1540, and one or more file system data blocks (e.g., "clusters") 1550. Notably, while the data structures are shown as separate blocks, those skilled in the art will understand that certain blocks may be contained within and/or merged with other blocks accordingly (e.g., superblock 1520 within boot block 1510, etc.).

Boot sector/block 1510 may comprise information relating to semantics of the client file system, such as a file system type (e.g., NTFS), and, if not contained within the boot sector, pointers 1515 to other file system information, such as pointers to blocks 1520, 1530, 1540, etc. For instance, file system superblock 1520 may be used to denote information such as the bytes-per-sector and sectors-per-cluster for the client file system 1500 (e.g., for NTFS), etc. Notably, clusters are an illustrative term used to denote a client file system storage unit (generally), particularly for use with NTFS. Client file system storage units (clusters) 1550 may range in size, for example, from 512 B to 64 KB, and are the core storage units by which the client file system operates (as described herein and as will be understood by those skilled in the art). The superblock 1520, then, may be used to indicate the particular storage unit size used by the client file system 1500, accordingly. In particular, as described above and as used herein, a client file system storage unit (file block) corresponds to one or more vvbns in a flexible volume 1150, and to one or more pvbns (physical storage blocks/units) in the aggregate 1000 of the storage system 500.

Master file table block 1530 illustratively stores an allocation bitmap that represents which storage units are in use by the client file system 1500, where each bit represents one client file system storage unit (e.g., a "blockmap"). For instance, when deleting client file system storage units (e.g., corresponding to a deleted file), the client file system typically updates appropriate file system metadata (e.g., the allocation bitmap 1530) to show that the deleted storage units may be subsequently re-used. Of particular interest to the present invention, however, the allocation bitmap (master file table block) 1530 of the client file system 1500 does not correlate to the allocation of storage system storage units (i.e., to pvbn allocation of the aggregate 1000, nor to vvbn allocation of the flexible volume 1150). That is, when the client file system 1500 deletes client file system storage units, the storage system 500 is only aware that one or more storage system storage units (e.g., a block unknowingly corresponding to the allocation bitmap 1130 of the file system) have changed. In this manner, the storage system storage units remain allocated, even though the client file system no longer necessarily utilizes the storage system storage units, hence the need to reclaim unused storage space.

In accordance with the present invention, hole punching process 667 of storage system 500 may be configured to reclaim unused storage space in response to a manual administrator command or a dynamic trigger (e.g., in response to creating a PCPI, on a scheduled interval, etc.). Accordingly, the hole punching process 667 may determine a storage mapping between storage units of the client file system (file data blocks/clusters 1550) and storage units of the storage system (physical storage blocks/pvbns 906/1220). In particular, the hole punching process, in conjunction with LUN cracking process 668, may determine a file system type of the client file system (e.g., NTFS) and other useful information by "cracking" the LUN, i.e., reading enough of the data on the exported LUN (e.g., for a particular flexible volume 1010/1150) to understand the underlying semantics of the overlaid client file system. For instance, by determining the location of a boot sector/block 1510 of the client file system (e.g., the first or "0" block of many file systems), the hole punching process 667 may dynamically determine the type of client file system as identified within the boot sector, as well as other client file system specific information or locations of the other file system specific information blocks (e.g., from pointers 1515). (Alternatively, through configuration, the hole punching process 667 may be previously aware of the overlaid client file system, e.g., NTFS, and may thus know the location of these blocks in advance.)

Illustratively, one client file system specific block is the superblock 1520, which contains information about the configuration (e.g., size) of the client file system storage units 1550, such as the bytes-per-sector and sectors-per-cluster, etc., as described above. Notably, the storage system 500 is aware of the configuration of storage system storage units (e.g., 4 kB blocks), and in accordance with exported storage as described above and as will be understood by those skilled in the art, is aware of the byte-level mapping between the client file system and storage system. That is, when the client file system 1500 sends a write or read request for a number of bytes, the storage system 500 knows which bytes to access, regardless of which client file system storage units or storage system storage units those bytes correspond.

With the storage system specific information/configuration, as well as the information about the client file system (e.g., from the superblock 1520), the hole punching process 667 of the storage system may map the client file system storage units (e.g., clusters) to storage system storage units (e.g., pvbns or L0 blocks). Notably, the storage mapping may comprise one or more storage system storage units corresponding to one or more client file system storage units. For instance, one storage system storage unit may correspond to a plurality of client file system storage units (e.g., "1-to-multiple" mapping), a plurality of storage system storage units may correspond to a client file system storage unit (e.g., "multiple-to-1" mapping), a storage system storage unit may correspond to a client file system storage unit ("1-to-1" mapping), or a plurality of storage system storage units may correspond to a plurality of client file system storage units ("multiple-to-multiple" mapping). For example, in an illustrative embodiment, the storage system storage units may contain 4 kB of data, and the client file system storage units 1550 may contain 512 B of data. As such, the mapping is one storage system storage unit for every eight client file system storage units ("1-to-8"). Conversely, if the file system storage units 1550 contained 64 kB of data, the mapping would be sixteen storage system storage units for every one client file system storage unit ("16-to-1"). (Those skilled in the art will appreciate that if the order of the mapping from storage system to client file system is reversed, the notation of "1-to-8" or "16-to-1" may be reversed accordingly.)

Also, in accordance with one or more embodiments of the present invention, the hold punching process 667 (e.g., with LUN cracking process 668) determines a client file system representation of storage unit usage, such as by examining the allocation bitmap (master file table) 1530 of the client file system 1500. From the representation of usage (bitmap 1530), the hole punching process 667 may determine client file system storage units that are unused, such as unset/cleared (e.g., "0") bits in bitmap 1530 accordingly. Based on the storage mapping and the client file system representation of storage unit usage, hole punching process 667 may thus correlate unused client file system storage units with corresponding storage system storage units. For example, for each unused bit in the bitmap 1530 (for each unused client file system storage unit 1550), the hole punching process 667 determines a set of corresponding storage system storage units (pvbns 906/1220) of the aggregate 1000. For instance, based on the storage mapping, if a plurality of storage system storage units correspond to a single unused client file system storage unit, then that plurality of storage system storage units are correlated with the unused client file system storage unit. Conversely, if a single storage system storage unit corresponds to a plurality of client file system storage units, then that storage system storage unit is only correlated with unused client file system storage units if all of the corresponding client file system storage units are unused. In other words, the hole punching process correlates storage system storage units with unused client file system storage units in a manner that determines which storage system storage units are completely unused by the client file system 1500.

In accordance with the present invention, the hole punching process 667 may cooperate with the file system 665 to deallocate storage system storage units (e.g., pvbns) correlated with unused client file system storage units (e.g., 1550). In other words, the hole punching process may "punch holes in" or "hole punch" the storage system storage units of a data container, particularly of a specific client file system (e.g., a LUN of the client file system), thereby permitting the data container to shrink in size (e.g., to the size necessary to accommodate allocated storage units). To deallocate a storage system storage unit (to "punch a hole"), the hole punching process 667 may illustratively free the corresponding storage system storage unit (e.g., pvbn) of the aggregate, e.g., by marking the storage unit as unallocated in the active map 1112 of the aggregate 1000, thus allowing re-use of ("reclaiming") the storage space. Notably, as mentioned above, depending on the storage mapping between the storage system and the client file system, a single storage system storage unit or a plurality of storage system storage units may be deallocated for each corresponding (correlated) unused client file system storage unit (or plurality of units), accordingly.

While merely deallocating the storage system storage unit by marking the storage unit as unallocated in the active map 1112 of the aggregate 1000 frees the storage unit for re-use by the aggregate (e.g., by the client file system 1500 or other file system), there may be situations where the client file system 1500 from which the storage unit was freed may attempt to access (e.g., read) the correlated unused client file system storage unit(s). For example, certain utilities may be available to the client file system 1500 to read unused data, such as to recover deleted data/files. As such, it may be necessary to remove references to the storage system storage unit (e.g., to the pvbn) from the storage system 500, in order to prevent access to a storage unit that may have been modified (i.e., may return other data). In particular, in accordance with the illustrative storage system configuration described herein, each storage system storage unit (pvbn) has two references to that storage unit: the vvbn-to-pvbn mapping in the container file, and the pvbn/vvbn pointer pair 908 in the L1 indirect blocks 904. For example, once a pvbn/vvbn pointer pair 908 is determined for an access (e.g., read) request, the storage system may determine whether the corresponding pvbn is allocated (e.g., in the active map 1112 of the aggregate 1000), and if not, may check the container file to determine whether the pvbn mapped to the corresponding vvbn has changed (e.g., a mismatch typically due to an error in the system). In accordance with one or more embodiments of the present invention, then, to prevent access to a deallocated storage system storage unit, the hole punching process 667 may remove (modify) the vvbn-to-pvbn mapping in the container file, and the pvbn/vvbn pointer pair 908 in the L1 indirect blocks 904.

Notably, due to the fact the present invention allows a storage system to reclaim unused space of a data container without intervention/participation from the overlaid client file system, various concerns arise with modifying an active client file system without the client file system's knowledge. For example, the storage system may attempt to modify a storage unit that is currently being modified by the active client file system (such as, e.g., removing/modifying the indirect blocks for the storage units). According to one aspect of the present invention, therefore, the storage system data container from which unused space is to be reclaimed comprises a read-only image of the client file system, such as, e.g., a temporary write restriction on the client file system (e.g., until hole punching is complete), an inactive portion of the client file system, or a PCPI (snapshot) of the client file system at a particular point in time. In this manner, the storage system may ensure that the client file system is not concurrently accessing storage units previously unallocated when reclaiming unused space (that is, because the storage system acts without client file system participation).

Also, in the event the data container is a PCPI, various mechanisms may be used to maintain the integrity of the PCPI, i.e., to reclaim the unused space without affecting the read-only feature of the PCPI (e.g., such as remove the mapping to the deallocated storage system storage units, without modifying the read-only guarantees of the data container). For instance, where the illustrative embodiment may be a read-only image of the client file system (e.g., a PCPI), the hole punching process 667 may not have access to change indirect blocks 904/1219 (e.g., vvbn/pvbn pointer pairs 908 of the indirect L1 blocks). As such, to prevent client file system access to the deallocated storage unit (e.g., reads), the hole punching process may remove the vvbn-to-pvbn (e.g., virtual block to physical block) mapping from the container file of the exported LUN (e.g., of the flexible volume 1010/1150), as mentioned above. For read-only images, however, the indirect blocks (e.g., the pvbn/vvbn pointer pairs) are unchangeable, and thus remain unchanged. Also, vvbn allocations in the summary map 1164 and snap map 1165 (for snapshots) may also remain unchanged (i.e., are read only), such that the size of the LUN allocated to the client file system appears to remain unchanged. In this manner, the read-only image appears unchanged, but the physical storage (the storage system storage units) that "backs" the unused client file system storage units have been freed (reclaimed), and the client file system 1500 is unaware of any deallocated storage system storage units.

In particular, should the storage system receive a read (access) request for a deallocated storage system storage unit (of a read-only client file system or not), the storage system may traverse the access/read path to the deallocated storage unit (pvbn) (e.g., by traversing a buffer tree for file 900/1200 to the requested L0 blocks). Once the pvbn/vvbn pointer(s) 908 is (are) determined, the storage system (e.g., the file write anywhere system 665 of the storage system) may determine that the requested pvbn(s) is (are) unallocated. The storage system may then check the container file of the flexible volume to determine where the corresponding vvbn is mapped, e.g., to determine a possibly different pvbn mapped to the vvbn. By removing the mapping in the container file, the storage system determines that the no pvbn is mapped to the vvbn. Accordingly, the storage system may be configured to return an indication that the storage system storage unit is deallocated. For instance, when the storage system is unable to locate a corresponding pvbn (i.e., when the requested pvbn has been deallocated), the storage system may return an error (e.g., specifically identifying the requested storage unit as a deallocated storage unit), or data corresponding to all 0's (e.g., a "lost write" operation in the write anywhere file system 665), depending upon system configuration.

Notably, an indication may be made with reference to the client file system (e.g., the PCPI) that informs the client file system 1500 that unused client file system data blocks have been deallocated by the storage system (i.e., that holes have been punched). In this manner, the client file system may be aware of the punched holes, and may prevent read requests from being sent to the storage system for unused/unallocated file blocks. Moreover, such an indication may be used to inform the storage system that holes have already been punched in the client file system, such that the storage system knows not to attempt to punch holes again unnecessarily.

Figure 16:
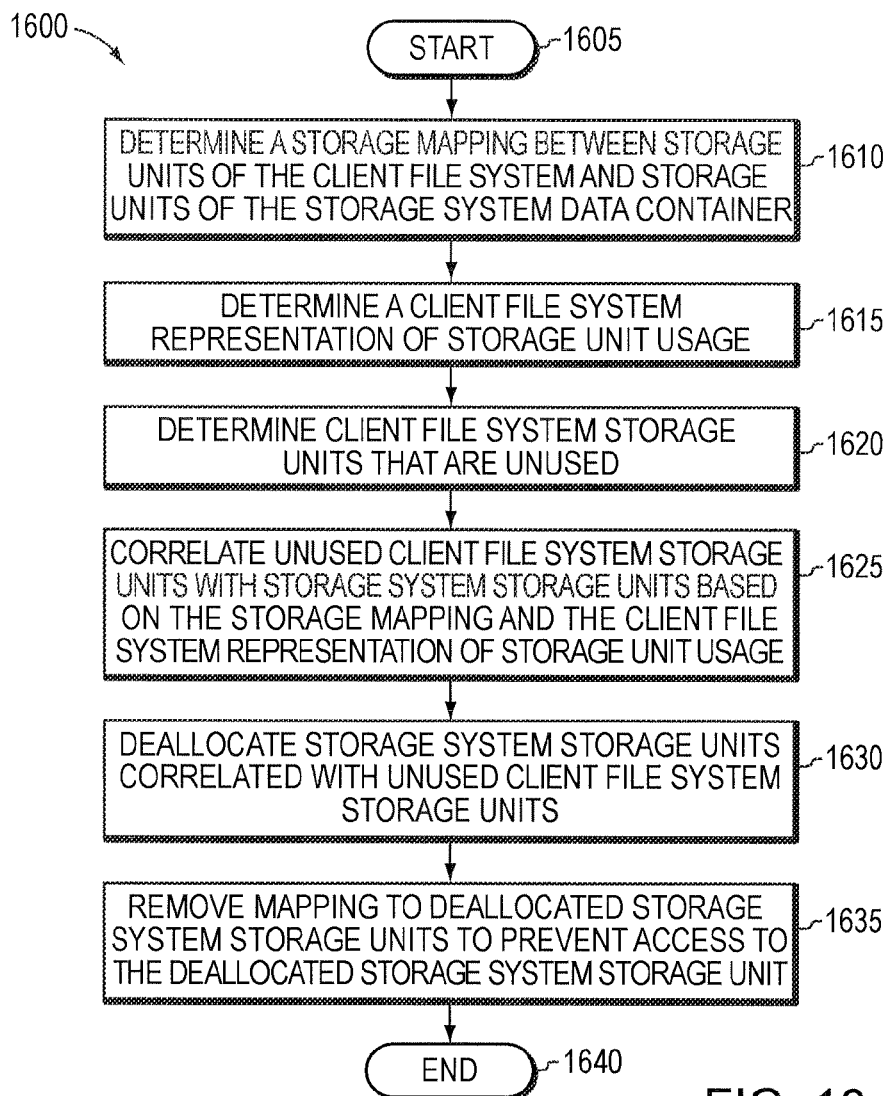
FIG. 16 is a flowchart detailing the steps of portions of a procedure for reclaiming unused space in a data container in accordance with an embodiment of the present invention.

FIG. 16 is a flowchart detailing the steps of a procedure 1600 for reclaiming unused space from a data container in accordance with an embodiment of the present invention. The data container is illustratively described herein as a flexible volume exported as a LUN; however, it should be noted that any suitable data container may be utilized in accordance with the principles of the present invention. As such, a flexible volume should not be taken to be limiting and any suitable data container may be utilized. The procedure 1600 begins in step 1605 and continues to step 1610 where hole punching process 667 of storage system 500 determines a storage mapping between storage units (e.g., file data blocks or clusters 1550) of the client file system 1500 and storage units (e.g., pvbns 906/1220) of the storage system data container (e.g., of the aggregate 1000). For example, by cracking the LUN as described above (e.g., LUN cracking process 668), the storage system may determine the type of file system (e.g., NTFS), and the location of particular files (e.g., the client file system superblock 1520) within the client file system that denote information such as the bytes-per-sector and sectors-per-cluster, etc. From this, the storage system (which is aware of byte-level mapping, as mentioned above) may map the client file system storage units (e.g., clusters) to storage system storage units (e.g., pvbns).

In step 1615, the storage system (e.g., hole punching process 667) may determine a client file system representation of storage unit usage, such as by determining a location of and subsequently extracting an allocation bitmap (master file table) 1530 from the client file system, e.g., based on the pointers 1515 determined from the cracked LUN. From this representation, the storage system may determine client file system storage units that are unused (or conversely, that are used) in step 1620, and in step 1625 may correlate unused client file system storage units with storage system storage units based on the storage mapping and client file system representation of storage unit usage, described above.

Once the unused client storage units are correlated in step 1625, the hole punching process 667 of the storage system 500 may deallocate storage system storage units correlated with unused client file system storage units in step 1630 accordingly. For instance, as mentioned above, the active map 1112 of the aggregate 1000 may be updated to reflect the deallocation of pvbns that correlate to unused client file system clusters. Notably, as also mentioned above, the mapping need not be a 1-to-1 mapping, but may instead be 1-to-multiple or multiple-to-1, in which case the deallocation is reflected appropriately.

Figure 17:
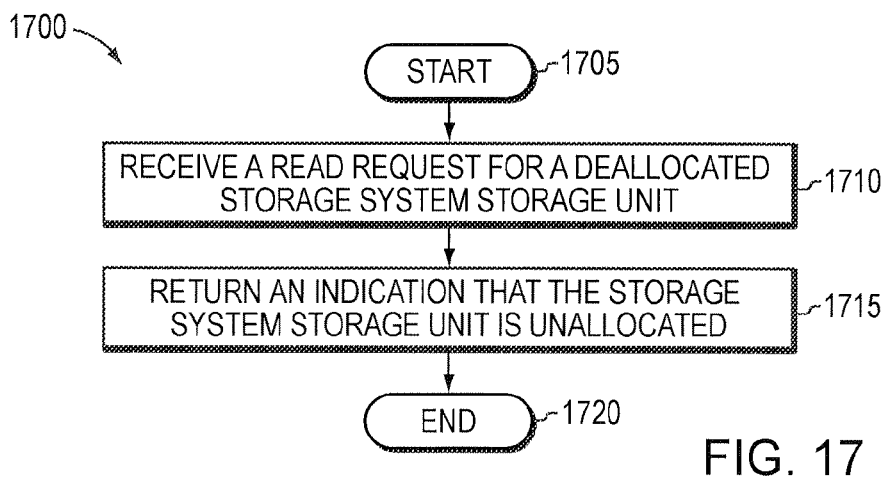
FIG. 17 is a flowchart detailing the steps of portions of a procedure for reclaiming unused space in a data container in accordance with an embodiment of the present invention.

Also, as discussed above, in step 1635 the hole punching process 667 may remove any mapping to deallocated storage system storage units to prevent access to (e.g., reading of) the deallocated storage system storage unit, and procedure 1600 ends in step 1640 with reclaimed unused space from a data container. Briefly, FIG. 17 is a flowchart detailing the steps of a procedure 1700 (that begins in step 1705) for attempting to read reclaimed space from a data container in accordance with an embodiment of the present invention. In particular, by removing any mappings, upon receiving a read/access request in step 1710, the storage system may determine that the mapping has been removed, and may return an indication that the storage unit is unallocated (e.g., returning all 0's or an error message, etc.) in step 1715. The procedure 1700 ends in step 1720.

Notably, while the above description and procedures are described in a manner that groups the determination of all unused client file system storage units, and the deallocation of corresponding storage system storage units, other, e.g., more particular, steps may be performed. For instance, a process loop may be established that checks each client file system storage unit one at a time (e.g., each bit of the allocation bitmap 1530), and determines whether to deallocate any corresponding storage system storage units accordingly (e.g., where client file system storage units map 1-to-1 or 1-to-multiple to storage system storage units). Alternatively, the loop may check each collection of client file system storage units that correspond to each storage system storage unit (e.g., where client file system storage units map multiple-to-1 to storage system storage units). Those skilled in the art will appreciate that whether the determinations and corresponding deallocations are performed in groups or independently (e.g., in a checking loop), the end result is substantially the same and is in accordance with the teachings of the present invention accordingly.

To again summarize, the present invention provides a system and method for reclaiming unused space in a data container on a storage system. In particular, the present invention allows a storage system to reclaim storage space not used by a client file system, without requiring assistance from the client file system to determine storage usage. In this manner, the data container (particularly, a read-only image of a data container) may consume less storage space, thereby enabling the container to shrink in accordance with the amount of data being stored thereon, allowing other client file systems to re-use the reclaimed space.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Additionally, while this description is written in terms of a data container disposed over an underlying client file system, it should be noted that other implementations may be utilized. As such, the use of an underlying client file system to support a data container should be taken as exemplary only. Accordingly this description is to be taken only by way of example and not to otherwise limit the scope of the invention. It is thus the object of the appended claims to cover such variations and modifications as come within the true spirit and scope of the invention.

What is claimed is:

1. A method for use by a storage system, comprising a processor and a memory, for reclaiming space unused by a client file system, the method comprising:
    determining a storage mapping between client file system storage units and storage system storage units, wherein the client file system storage units are overlaid onto the storage system storage units;
    determining a client file system representation of storage unit usage associated with the client file system storage units;
    determining, by the storage system; and without intervention from the client file system, unused client file system storage units;
    correlating the unused client file system storage units with particular storage system storage units based on the storage mapping and the client file system representation of storage unit usage to determine that the particular storage system storage units are unused by the client file system; and
    deallocating the particular storage system storage units correlated with the unused client file system storage units.

2. The method as in claim 1, wherein determining the storage mapping further comprises:
    determining a client file system type of the client file system.

3. The method as in claim 2, wherein determining the storage mapping further comprises:
    loading a boot sector of the client file system; and
    determining the client file system type from the boot sector.

4. The method as in claim 2, wherein determining the storage mapping further comprises:
    determining client file system specific information; and
    determining a configuration of the client file system storage units based on the specific information.

5. The method as in claim 4, wherein determining the storage mapping further comprises:
    determining a configuration of the storage system storage units; and
    mapping the client file system storage units to the storage system storage units based on the configuration of the storage system storage units and the configuration of the client file system storage units.

6. The method as in claim 1, wherein the storage mapping comprises one or more storage system storage units corresponding to one or more client file system storage units.

7. The method as in claim 6, wherein the storage mapping comprises one storage system storage unit corresponding to a plurality of client file system storage units, the method further comprising:
    deallocating the storage system storage unit if the corresponding plurality of client file system storage units are unused.

8. The method as in claim 6, wherein the storage mapping comprises a plurality of storage system storage units corresponding to a client file system storage unit that is unused, the method further comprising:
    deallocating the plurality of storage system storage units for the corresponding client file system storage unit that is unused.

9. The method as in claim 6, wherein the storage mapping comprises a storage system storage unit corresponding to a client file system storage unit that is unused, the method further comprising:
    deallocating the storage system storage unit for the corresponding client file system storage unit that is unused.

10. The method as in claim 1, wherein the client file system storage units on a storage system storage unit comprise a read-only image of the client file system.

11. The method as in claim 1, wherein the client file system storage units on a storage system storage unit comprise a persistent consistency point image (PCPI).

12. The method as in claim 1, wherein the client file system storage units are part of an inactive file system.

13. The method as in claim 1, wherein the client file system representation of storage unit usage associated with the client file system storage units is a bitmap.

14. The method as in claim 1, further comprising:
    receiving a read request for a deallocated storage system storage unit; and
    returning an indication that the deallocated storage system storage unit is deallocated.

15. The method as in claim 14, wherein the indication is data including all zeros.

16. The method as in claim 14, wherein the indication is a specific reply to the request that identifies the requested deallocated storage system storage unit as a deallocated storage unit.

17. The method as in claim 1, wherein the storage system storage units are physical blocks of storage that are mapped from virtual blocks of the storage system.

18. The method as in claim 17, further comprising:
    removing a mapping from a virtual block to a deallocated storage system storage unit to prevent reading the deallocated storage system storage unit from the mapping from the virtual block.

19. The method as in claim 18, wherein the mapping is removed from a container file that holds the mapping.

20. The method as in claim 1, wherein the client file system is unaware of any deallocated storage system storage units.

21. The method as in claim 1, wherein the storage system storage units comprise at least one flexible volume.

22. A storage system for reclaiming space unused by a client file system, the storage system comprising:
- a data container served by the storage system, the data container having one or more storage units;
- a communication medium established with the client file system, wherein the client file system is overlaid onto the data container having the one or more storage units served by the storage system;
- one or more processors configured to execute processes; and
- a memory configured to store a hole punching process executable by each processor, the hole punching process when executed operable to determine a storage mapping between storage units of the client file system and storage units of the storage system, determine a client file system representation of storage unit usage associated with the storage units of the client file system to determine client file system storage units that are unused, without intervention from the client file system, correlate the unused client file system storage units with particular storage system storage units based on the storage mapping and the client file system representation of storage unit usage to determine that the particular storage system storage units are unused by the client file system, and deallocate the particular storage system storage units correlated with the unused client file system storage units.

23. A storage system, comprising a processor and a memory, for reclaiming space unused by a client file system, the storage system comprising:
- a data container served by the storage system, the data container having one or more storage units;
- means for overlaying the client file system onto the data container having the one or more storage units served by the storage system;
- means for determining a storage mapping between storage units of the client file system and storage units of the storage system;
- means for determining a client file system representation of storage unit usage associated with the client file system storage units;
- means for determining for the storage system, without intervention from the client file system, unused client file system storage units;
- means for correlating the unused client file system storage units with particular storage system storage units based on the storage mapping and the client file system representation of storage unit usage to determine that the particular storage system units are unused by the client file system; and
- means for deallocating the particular storage system storage units correlated with the unused client file system storage units.

24. A method, comprising:
providing storage space on a storage system for a client file system overlaid onto the storage space on the storage system;
reclaiming, by the storage system comprising a processor and a memory, a particular storage space on the storage system not used by the client file system, without requiring intervention from the client file system, by correlating unused client file system storage units with the particular storage space on the storage system based on a storage mapping of the client file system with the storage system and a client file system representation.

25. The method as in claim 24, wherein used storage space is a read-only image of the client file system.

* * * * *

UNITED STATES PATENT AND TRADEMARK OFFICE
CERTIFICATE OF CORRECTION

PATENT NO.        : 8,086,652 B1  
APPLICATION NO.   : 11/838966  
DATED             : December 27, 2011  
INVENTOR(S)       : Bisson et al.

Page 1 of 1

It is certified that error appears in the above-identified patent and that said Letters Patent is hereby corrected as shown below:

Col. 13, line 25 should read: "~~Mode~~inode buffer tree. The read path on a flexible volume is"

Col. 13, line 38 should read: "e.g., level 1 (L1) indirect blocks, ~~Mode~~inode file level 0 (L0)"

Signed and Sealed this  
Twenty-eighth Day of February, 2012

David J. Kappos  
*Director of the United States Patent and Trademark Office*